US007798612B2

(12) United States Patent
Shaarawi et al.

(10) Patent No.: US 7,798,612 B2
(45) Date of Patent: Sep. 21, 2010

(54) MICROFLUIDIC ARCHITECTURE

(75) Inventors: Mohammed S. Shaarawi, Corvallis, OR (US); Kenneth Hickey, Dublin (IE); Will O'Reilly, Dublin (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 144 days.

(21) Appl. No.: 12/109,192

(22) Filed: Apr. 24, 2008

(65) Prior Publication Data

US 2008/0198202 A1 Aug. 21, 2008

Related U.S. Application Data

(60) Division of application No. 11/098,706, filed on Apr. 4, 2005, now Pat. No. 7,387,370, which is a continuation-in-part of application No. 10/834,777, filed on Apr. 29, 2004, now Pat. No. 7,293,359.

(51) Int. Cl.

*B41J 2/05* (2006.01)
*G01D 15/00* (2006.01)
*G11B 5/127* (2006.01)

(52) U.S. Cl. .......................................... 347/63; 216/27

(58) Field of Classification Search .................. 347/56, 347/63, 64

See application file for complete search history.

(56) References Cited

U.S. PATENT DOCUMENTS

| | | | |
|---|---|---|---|
| 4,229,265 | A | 10/1980 | Kenworthy |
| 4,246,076 | A | 1/1981 | Gardner |
| 4,296,421 | A | 10/1981 | Hara et al. |
| 4,374,707 | A | 2/1983 | Pollack |
| 4,412,224 | A | 10/1983 | Sugitani |
| 4,438,191 | A | 3/1984 | Cloutier et al. |
| 4,455,561 | A | 6/1984 | Boyden et al. |
| 4,528,577 | A | 7/1985 | Cloutier et al. |
| 4,532,530 | A | 7/1985 | Hawkins |
| 4,789,425 | A | 12/1988 | Drake et al. |
| 4,984,664 | A | 1/1991 | Sugano |
| 5,016,024 | A | 5/1991 | Lam et al. |
| 5,122,812 | A | 6/1992 | Hess et al. |
| 5,159,353 | A | 10/1992 | Fasen et al. |
| 5,167,776 | A | 12/1992 | Bhaskar et al. |
| 5,211,806 | A | 5/1993 | Wong et al. |

(Continued)

OTHER PUBLICATIONS

Aden, J. Stephen et al., The Third Generation HP Thermal InkJet Printhead, Hewlett-Packard Journal, Feb. 1994, pp. 41-45.

(Continued)

*Primary Examiner*—Matthew Luu
*Assistant Examiner*—Lisa M Solomon

(57) ABSTRACT

A microfluidic architecture is disclosed. The microfluidic architecture includes a substrate having an edge and a thin film stack established on at least a portion of the substrate adjacent the edge. The thin film stack includes a non-conducting layer and a seed layer, where the seed layer is positioned such that a portion of the non-conducting layer is exposed. A chamber layer is established on at least a portion of the seed layer. The non-conducting layer, the seed layer, and the chamber layer define a microfluidic chamber. A layer having a predetermined surface property is electroplated on the chamber layer and on at least one of another portion of the seed layer and the exposed portion of the non-conducting layer.

22 Claims, 13 Drawing Sheets

U.S. PATENT DOCUMENTS

| | | | | |
|---|---|---|---|---|
| 5,229,785 | A * | 7/1993 | Leban | 347/47 |
| 5,236,572 | A | 8/1993 | Lam et al. | |
| 5,493,320 | A | 2/1996 | Sandbach, Jr. et al. | |
| 5,635,968 | A | 6/1997 | Bhaskar et al. | |
| 5,796,416 | A | 8/1998 | Silverbrook | |
| 5,805,186 | A | 9/1998 | Yoshida et al. | |
| 5,877,791 | A | 3/1999 | Lee et al. | |
| 6,007,188 | A | 12/1999 | MacLeod et al. | |
| 6,045,215 | A | 4/2000 | Coulman | |
| 6,074,043 | A | 6/2000 | Ahn | |
| 6,113,216 | A | 9/2000 | Wong | |
| 6,113,221 | A | 9/2000 | Weber | |
| 6,123,413 | A | 9/2000 | Agarwal et al. | |
| 6,155,676 | A | 12/2000 | Etheridge, III et al. | |
| 6,159,387 | A | 12/2000 | Mou et al. | |
| 6,161,923 | A | 12/2000 | Pidwerbecki et al. | |
| 6,180,427 | B1 | 1/2001 | Silverbrook | |
| 6,227,654 | B1 | 5/2001 | Silverbrook | |
| 6,243,113 | B1 | 6/2001 | Silverbrook | |
| 6,244,691 | B1 | 6/2001 | Silverbrook | |
| 6,245,245 | B1 | 6/2001 | Sato | |
| 6,254,219 | B1 | 7/2001 | Agarwal et al. | |
| 6,267,471 | B1 | 7/2001 | Ramaswami et al. | |
| 6,273,544 | B1 | 8/2001 | Silverbrook | |
| 6,299,294 | B1 | 10/2001 | Regan | |
| 6,299,300 | B1 | 10/2001 | Silverbrook | |
| 6,305,788 | B1 | 10/2001 | Silverbrook | |
| 6,309,048 | B1 | 10/2001 | Silverbrook | |
| 6,310,639 | B1 | 10/2001 | Kawamura et al. | |
| 6,315,384 | B1 | 11/2001 | Ramaswami et al. | |
| 6,318,849 | B1 | 11/2001 | Silverbrook | |
| 6,322,201 | B1 | 11/2001 | Beatty et al. | |
| 6,328,405 | B1 | 12/2001 | Weber et al. | |
| 6,336,713 | B1 | 1/2002 | Regan et al. | |
| 6,364,461 | B2 | 4/2002 | Silverbrook | |
| 6,365,058 | B1 | 4/2002 | Beatty et al. | |
| 6,371,596 | B1 | 4/2002 | Maze et al. | |
| 6,375,313 | B1 | 4/2002 | Adavikolanu et al. | |
| 6,390,603 | B1 | 5/2002 | Silverbrook | |
| 6,402,296 | B1 | 6/2002 | Cleland et al. | |
| 6,402,300 | B1 | 6/2002 | Silverbrook | |
| 6,416,167 | B1 | 7/2002 | Silverbrook | |
| 6,420,196 | B1 | 7/2002 | Silverbrook | |
| 6,423,241 | B1 | 7/2002 | Yoon et al. | |
| 6,425,651 | B1 | 7/2002 | Silverbrook | |
| 6,439,689 | B1 | 8/2002 | Silverbrook | |
| 6,439,699 | B1 | 8/2002 | Silverbrook | |
| 6,443,558 | B1 | 9/2002 | Silverbrook | |
| 6,451,216 | B1 | 9/2002 | Silverbrook | |
| 6,460,778 | B1 | 10/2002 | Silverbrook | |
| 6,464,340 | B2 | 10/2002 | Silverbrook | |
| 6,475,402 | B2 | 11/2002 | Nordstrom et al. | |
| 6,481,831 | B1 | 11/2002 | Davis et al. | |
| 6,488,358 | B2 | 12/2002 | Silverbrook et al. | |
| 6,488,362 | B2 | 12/2002 | Silverbrook | |
| 6,489,084 | B1 | 12/2002 | Pidwerbecki et al. | |
| 6,491,833 | B1 | 12/2002 | Silverbrook | |
| 6,503,408 | B2 | 1/2003 | Silverbrook | |
| 6,505,912 | B2 | 1/2003 | Silverbrook et al. | |
| 6,508,546 | B2 | 1/2003 | Silverbrook | |
| 6,520,624 | B1 | 2/2003 | Horvath et al. | |
| 6,530,653 | B2 | 3/2003 | Le et al. | |
| 6,535,237 | B1 | 3/2003 | Wong | |
| 6,540,325 | B2 | 4/2003 | Kawamura et al. | |
| 6,543,880 | B1 | 4/2003 | Akhavain et al. | |
| 6,547,364 | B2 | 4/2003 | Silverbrook | |
| 6,547,371 | B2 | 4/2003 | Silverbrook | |
| 6,557,978 | B2 | 5/2003 | Silverbrook | |
| 6,561,625 | B2 | 5/2003 | Maeng et al. | |
| 6,588,882 | B2 | 7/2003 | Silverbrook | |
| 6,598,964 | B2 | 7/2003 | Silverbrook | |
| 6,623,108 | B2 | 9/2003 | Silverbrook | |
| 6,634,735 | B1 | 10/2003 | Silverbrook | |
| 6,641,254 | B1 | 11/2003 | Boucher et al. | |
| 6,644,786 | B1 | 11/2003 | Lebens | |
| 6,644,793 | B2 | 11/2003 | Silverbrook | |
| 6,648,453 | B2 | 11/2003 | Silverbrook | |
| 6,652,074 | B2 | 11/2003 | Silverbrook | |
| 6,652,082 | B2 | 11/2003 | Silverbrook | |
| 6,773,094 | B2 | 8/2004 | Linliu et al. | |
| 6,848,772 | B2 | 2/2005 | Kim | |
| 2002/0054191 | A1 | 5/2002 | Moon et al. | |
| 2005/0046677 | A1 | 3/2005 | Park et al. | |

OTHER PUBLICATIONS

Beeson, Rob, Thermal Inkjet: Meeting the Applications Challenge, printed from website http://www.hp.com/oeminkjet/reports/techpress-6.pdf on Jan. 7, 2004, 4 pages.

Lee, Jae-Duk et al., A Thermal Inkjet Printhead with a Monolithically Fabricated Nozzle Plate & Self-Aligned Ink Feed Hole, J. of MEMS, V.8, No. 3, Sep. 1999, pp. 229-236.

* cited by examiner

FROM FIG. 1L
12
30
37
38
50
54
60
62
70
172

MICROFLUIDIC ARCHITECTURE

CROSS-REFERENCE TO RELATED APPLICATIONS

This application is a divisional of U.S. application Ser. No. 11/098,706, filed Apr. 4, 2005, now U.S. Pat. No. 7,387,370, which is a continuation-in-part of U.S. application Ser. No. 10/834,777, filed Apr. 29, 2004, now U.S. Pat. No. 7,293,359, all of which are hereby incorporated by reference.

BACKGROUND

The present disclosure relates generally to fluidic architectures, and more particularly to microfluidic architectures and methods of making the same.

Fluidic architectures, such as those used in fluid ejection assemblies, utilize a chamber and a plurality of nozzles or apertures through which fluids are ejected. The microfluidic architecture used to form the chamber and nozzles may include a semiconductor substrate or wafer having a number of electrical components provided thereon (e.g., an ink-jetting device may include a resistor for heating ink in the chamber to form a bubble in the ink, which forces ink out through the nozzle).

The chamber and nozzle may be formed from layers of polymeric materials. One potential difficulty with the use of polymeric materials to form the nozzle and chamber is that such materials may become damaged or degraded when used with particular fluids (e.g., inks having relatively high solvent contents, etc.). Another difficulty with the use of polymeric materials is that such materials may become damaged or degraded when subjected to certain temperatures that may be reached during operation of the device in which the architecture is being used.

The chamber and nozzle may also be formed of metals. Certain metals may have desirable material properties, however, these metals may also increase the cost of manufacturing the microfluidic architectures.

Still further, processes for forming and coating architectures are generally not selective processes. As such, substantially the entire architecture is formed from the same material in order to achieve desired surface properties. Further, if a coating is desirable on the architecture, generally a coating should be used that is compatible with the device and/or components that are coated in the process.

As such, it would be desirable to provide a microfluidic architecture that may be selectively coated and relatively inexpensively manufactured.

SUMMARY

A microfluidic architecture is disclosed herein. The microfluidic architecture includes a substrate having an edge and a thin film stack established on at least a portion of the substrate adjacent the edge. The thin film stack includes a non-conducting material layer and a seed layer, where the seed layer is positioned such that a portion of the non-conducting material layer is exposed. A chamber layer is established on at least a portion of the seed layer. The non-conducting material layer, the seed layer, and the chamber layer define a microfluidic chamber. A layer having a predetermined surface property is electroplated on the chamber layer and on at least one of an other portion of the seed layer and the exposed portion of the non-conducting layer.

BRIEF DESCRIPTION OF THE DRAWINGS

Objects, features and advantages of embodiments of the present disclosure will become apparent by reference to the following detailed description and drawings, in which like reference numerals correspond to similar, though not necessarily identical components. For the sake of brevity, reference numerals having a previously described function may not necessarily be described in connection with subsequent drawings in which they appear.

DETAILED DESCRIPTION

Embodiment(s) of the microfluidic architecture described herein are suitable for use in a variety of devices. Specifically, embodiment(s) of the microfluidic architecture may be incorporated into, for example, ink-jet printheads or cartridges, fuel injectors, microfluidic biological devices, pharmaceutical dispensing devices, and/or the like. Further, an embodiment of the method for forming the architecture allows for selective establishment of the various elements, thus allowing a variety of materials to be used.

Referring now to FIGS. 1A through 1M, two alternate embodiments of forming embodiments of microfluidic architectures 10 are schematically depicted. Both embodiments of the method include establishing a thin film stack 30 on a substrate 12. The substrate 12 may be formed of any suitable material. In an embodiment, the substrate 12 is selected depending, at least in part, on the device in which the architecture 10 is operatively disposed. Non-limitative examples of substrate materials include semiconductor materials, silicon wafers, quartz wafers, glass wafers, polymers, metals, and the like. It is to be understood that polymeric substrates are generally coated with a seed layer that may act as a cathode. Further, the substrate 12 may also contain logic and/or drive/power electronics; or the substrate may contain a resistor that interconnects to off die power and logic circuitry.

Figures 1A, 1B, 1C, 1D, 1H, 1I, 1M:
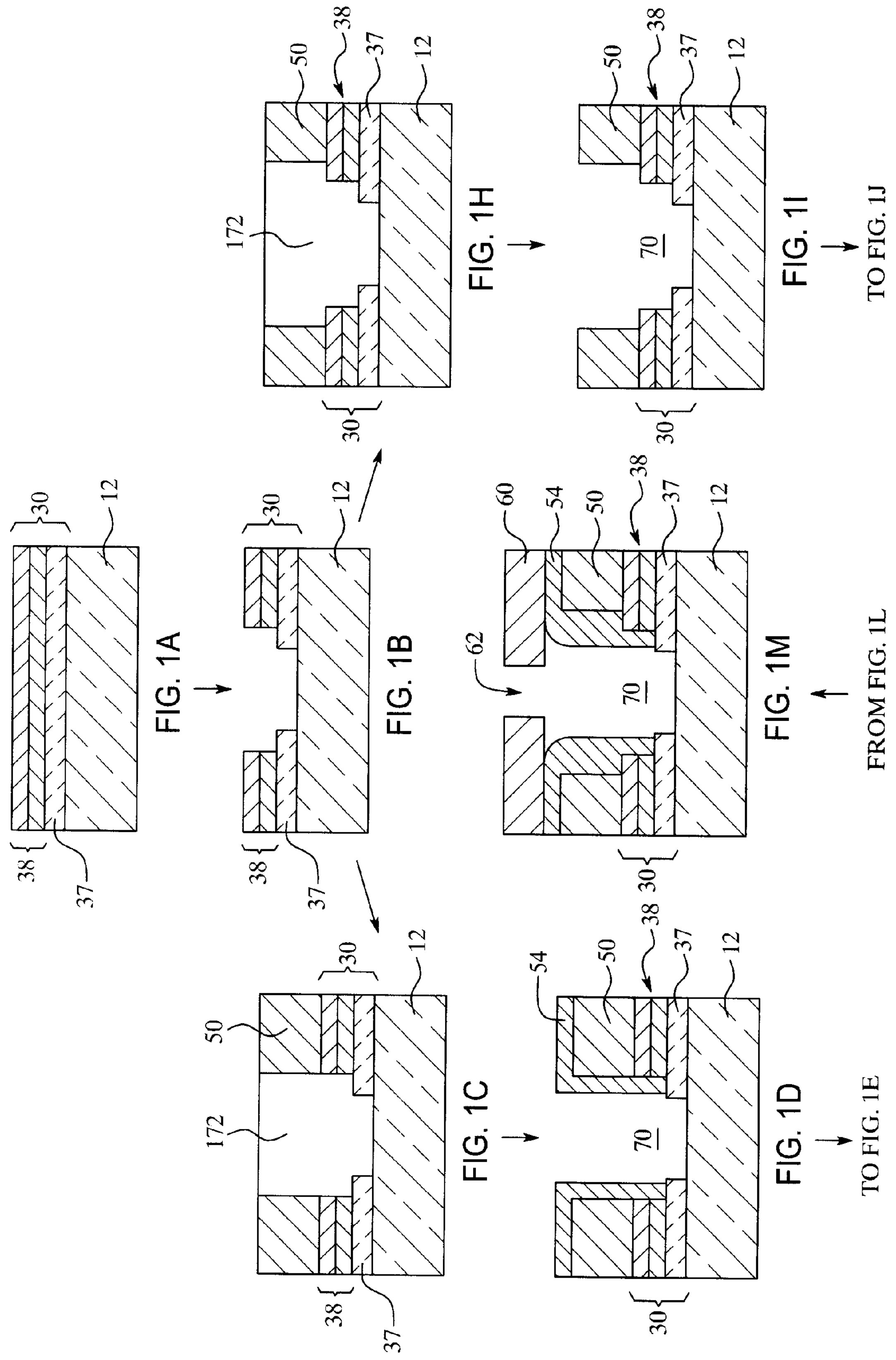
FIGS. 1A through 1M are semi-schematic cross-sectional views depicting alternate methods of forming alternate embodiments of microfluidic architectures.

The thin film stack 30 includes a non-conducting layer 37 and a seed layer 38. As depicted in FIG. 1A, generally the non-conducting layer 37 is blanket established on the substrate 12, and the seed layer 38 is blanket established on the non-conducting layer 37. The thin film stack 30 may be established by any suitable technique, including, but not limited to physical vapor deposition (PVD), evaporative deposition, chemical vapor deposition (CVD), plasma enhanced physical vapor deposition, plasma enhanced chemical vapor deposition, spin-coating of appropriate precursor mixtures and baking (i.e. spin on glass), or electroless deposition (i.e. autocatalytic plating), or the like.

The non-conducting layer 37 may be formed of any suitable non-conducting material. Non-limitative examples of non-conducting materials are dielectric materials. It is to be understood that the dielectric material may be an organic dielectric material, an inorganic dielectric material and/or a hybrid mixture of organic and inorganic dielectric materials. A non-limitative example of the organic dielectric material is poly(vinylphenol) (PVP), and non-limitative examples of the inorganic dielectric material are silicon nitride and silicon dioxide. Other examples of materials suitable for the non-conducting layer 37 include, but are not limited to tetraethylorthosilicate (TEOS), borophosphosilicate glass, borosilicate glass, phosphosilicate glass, aluminum oxide, silicon carbide, silicon nitride, and/or combinations thereof, and/or the like. It is to be understood that nonstoichiometric forms of these compounds may be used as well.

The seed layer 38 may include one or more layers, at least one of which acts as a cathode. According to an example embodiment, seed layer 38 includes one or more metals, such as gold, tantalum, alloys thereof, or combinations thereof. In the embodiment depicted in FIG. 1A, the seed layer 38 includes a gold layer established on a tantalum layer. According to other embodiments, the seed layer may include any of a variety of other metals or metal alloys such as nickel, nickel-chromium alloys, copper, titanium and gold layers, titanium-tungsten alloys, titanium, palladium, chromium, rhodium, alloys thereof, and/or combinations thereof. According to an example embodiment, seed layer 38 has a thickness ranging from about 500 angstroms to about 1,000 angstroms. According to other example embodiments, the thickness of seed layer 38 is between approximately 500 angstroms and 10,000 angstroms.

The methods further include selectively etching the thin film stack 30 such that a portion of the substrate 12 and a portion of the non-conducting layer 37 are exposed, as depicted in FIG. 1B. It is to be understood that the seed layer 38 may be etched prior to etching the non-conducting layer 37. Any suitable etching process may be used for the seed layer 38. The non-conducting layer 37 is generally etched using a resist pattern that protects the seed layer 38 while exposing the non-conducting layer 37 areas that are to be etched. In an embodiment, etching is accomplished by plasma etching (e.g. reactive ion etching or sputter etching) or wet chemical etching. After the etching is complete, in a non-limitative example, the thin film stack 30 is established adjacent the edge(s) of the substrate 12.

FIGS. 1C through 1G depict the formation of one embodiment of the microfluidic architecture 10, and FIGS. 1H through 1M depict the formation of another embodiment of the microfluidic architecture 10.

Referring now to FIG. 1C, an embodiment of the method includes establishing a sacrificial layer 172 (i.e. sacrificial structure) on the exposed portions of the substrate 12 and non-conducting layer 37. It is to be understood that any suitable sacrificial material 172 may be used. Non-limitative examples of suitable sacrificial materials include photoresists, tetraethylorthosilicate (TEOS), spin-on-glass, polysilicon, and/or combinations thereof.

The sacrificial layer 172 may be established via spray coating, spin coating, or a lamination process if, for example, the sacrificial layer 172 is a resist. In another embodiment, the sacrificial layer 172 may be established via chemical vapor deposition or physical vapor deposition, and/or the like.

It is to be understood that the sacrificial material 172 may be formed or patterned in any pattern that is desirable for the subsequently established chamber layer 50. The chamber layer 50 is established such that it substantially overlies the thin film stack 30 in an area not covered by the sacrificial layer 172, for example, the seed layer 38. As such, the sacrificial material 172 acts as a mandrel or mold around which the chamber layer 50 may be established. The sacrificial material 172 also acts to mask portions of the underlying elements (e.g. substrate 12 and non-conductive layer 37) from having the chamber layer 50 established thereon. While chamber layer 50 is shown as being deposited such that its top surface is substantially planar with the top surface of sacrificial material 172, chamber layer 50 may be deposited to a level higher than the top surface of sacrificial structure 172 and polished or etched such that it is coplanar with the top surface of sacrificial structure 172.

According to an example embodiment, chamber layer 50 is formed of nickel or a nickel alloy. According to various other example embodiments, chamber layer 50 may include other metals or metal alloys such as one or more of nickel, iron, cobalt, copper, chromium, zinc, palladium, gold, platinum, rhodium, silver, alloys thereof (non-limitative examples of which include iron-cobalt (Fe—Co) alloys, palladium-nickel (Pd—Ni) alloys, gold-tin (AuSn) alloys, gold-copper (AuCu) alloys, nickel-tungsten (NiW) alloys, nickel-boron (NiB) alloys, nickel-phosphorous (NiP) alloys, nickel-cobalt (NiCo) alloys, nickel-chromium (NiCr) alloys, silver-copper (AgCu) alloys, palladium-cobalt (PdCo) alloys, and others), and/or mixtures thereof. In a non-limitative example, the metal or metal alloy utilized for chamber layer 50 may be established by an electroplating or electroless deposition process. It is to be understood that the chamber layer 50 may also be established via a PVD or CVD process.

In an embodiment, chamber layer 50 has a thickness ranging from about 20 micrometers to about 100 micrometers. According to other example embodiments, chamber layer 50 has a thickness ranging from about 1 micrometer to about 50 micrometers.

Referring now to FIG. 1D, the sacrificial layer 172 is removed subsequent to the establishment of the chamber layer 50. The removal of the sacrificial layer 172 may be accomplished via any suitable technique. It is to be understood that the technique may be selected, in part, depending on the sacrificial material 172 used. In an embodiment, the sacrificial material 172 is removed via solvent stripping processes, acidic solutions (non-limitative examples of which include sulfuric acid, hydrochloric acid, and the like), basic solutions (non-limitative examples of which include tetramethyl ammonium hydroxide, potassium hydroxide, and the like), or combinations thereof. It is to be understood that oxygen plasma etching may be used to remove polymeric sacrificial materials.

As depicted in FIG. 1D, a microfluidic chamber 70 is formed upon the removal of the sacrificial material 172. In an embodiment, the chamber 70 is defined by the substrate 12, the thin film stack 30, and the chamber layer 50. The chamber 70 may contain, but is not limited to containing, biological fluids, inks, fuels, pharmaceutical fluids, and the like. It is to be understood that the architecture(s) 10 may also contain means for supplying and removing such liquids from the chamber 70, however such means are not depicted here for clarity.

FIG. 1D also depicts the establishment of the layer 54 having a predetermined surface property on the chamber layer 50. It is to be understood that this layer 54 may be selectively electroplated such that it is adjacent a top surface of the chamber layer 50 in addition to being adjacent those portions of the chamber layer 50 and the seed layer 38 that are exposed to the chamber 70. It is to be understood that the selectivity of the electroplating advantageously allows the layer 54 to come to rest on the non-conductive layer 37 without being exposed to the substrate 12.

The layer 54 having the predetermined surface property may be selected to provide corrosion resistance to the chamber layer 50 and the seed layer 38. Other properties that the layer 54 may include, but are not limited to surface hardness, wettability, surface roughness, brightness, predetermined density, predetermined surface finish (e.g. substantially crack free), predetermined porosity, and/or combinations thereof.

In an embodiment where the surface appears to have relatively shiny deposits, the average surface roughness ranges from about 2 nm to about 20 nm. In an alternate embodiment where the surface appears to have relatively rough deposits or a matted appearance, the average surface roughness is greater than about 0.5 μm. Where a softer surface is desired, layer 54 may have a hardness ranging from about 80 VHN (Vickers Hardness) to about 120 VHN, and where a harder surface is desired, layer 54 may have a hardness greater than about 600 VHN. Regarding the wettability of layer 54, a contact angle (when measured with water) may be greater than about 50°, and in an alternate embodiment, the contact angle may be greater than about 90°. It is to be understood that when a high wetting surface is desired, the contact angle may be less than about 10°.

In an embodiment, the layer 54 is palladium, nickel, cobalt, gold, platinum, rhodium, alloys thereof, and/or mixtures thereof. Without being bound to any theory, it is believed that because the layer 54 is selectively electroplated independent of the rest of the architecture 10 elements, a variety of materials may be selected (e.g. a nickel chamber layer 50 and a palladium layer 54), thereby allowing manufacturing to be relatively inexpensive while maintaining the surface integrity of the architecture 10.

The layer 54 is generally a thin layer. In an embodiment, the thickness of the layer 54 ranges from about 0.05 μm to about 4 μm. In a non-limitative example, the thickness of the layer 54 is about 1 μm.

In one embodiment, a second seed layer (i.e. thin adhesion layer) 52 (described further hereinbelow in reference to FIGS. 2D-2K) may be established on the chamber layer 50 prior to the deposition of the layer 54.

Figures 1E, 1F, 1G, 1J, 1K, 1L:
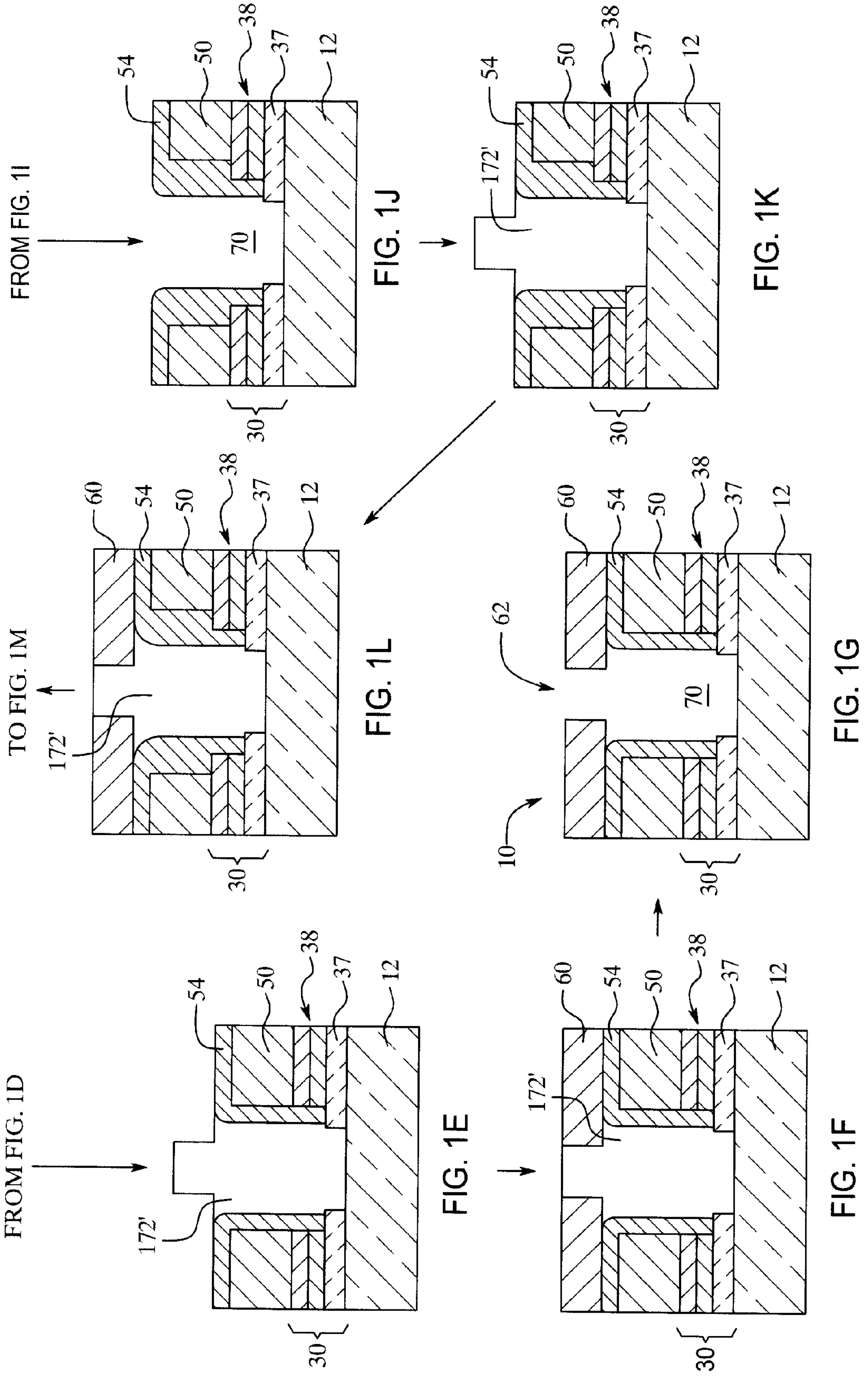

Referring now to FIG. 1E, another sacrificial layer 172' is established in a predetermined pattern in the chamber 70. This sacrificial layer 172' is generally patterned such that the subsequently deposited nozzle layer 60 has an opening defined therein. It is to be understood that the sacrificial layer 172' substantially covers the chamber 70 such that the nozzle layer does not penetrate the chamber 70.

FIG. 1F depicts the establishment of the nozzle layer 60. In an embodiment, the nozzle layer 60 is selectively electroplated such that it substantially overlies the layer 54 in an area not covered by the sacrificial layer 172', for example, directly above the chamber layer 50. As such, the sacrificial material 172' acts as a mandrel or mold upon which and/or around which the nozzle layer 60 may be established.

According to an example embodiment, nozzle layer 60 includes the same material as is used to form chamber layer 50. According to other example embodiments, chamber layer 50 and nozzle layer 60 may be formed of different materials.

Referring now to FIG. 1G, the second sacrificial layer 172' is removed in a manner such as those previously described. Upon the removal of sacrificial layer 172', the nozzle layer 60 is formed having opening 62 (e.g., an aperture or hole is provided in nozzle layer 60 to define opening 62) defined therein and chamber 70 is exposed. It is to be understood that the nozzle layer 60 may be further patterned to define opening 62. According to an example embodiment, opening 62 is formed as a relatively cylindrical aperture through nozzle layer 60, and may have a diameter ranging from about 1 micrometer to about 20 micrometers. According to other example embodiments, the diameter of opening 62 is between approximately 4 and 45 micrometers. It is to be understood that opening 62 may allow fluid to enter and/or exit the microfluidic chamber 70.

It is to be understood that FIG. 1G also depicts one embodiment of the microfluidic architecture 10.

Referring now to FIGS. 1H through 1M, another embodiment of the method of forming a microfluidic architecture 10 is depicted. After the etching of the thin film stack 30 (shown in FIG. 1B), the sacrificial layer 172 is established on a portion of the seed layer 38, the exposed portion of the non-conducting layer 37, and the exposed portion of the substrate 12. FIG. 1H also depicts the electrodeposited chamber layer 50. In this embodiment, the chamber layer 50 is established on a portion of the seed layer 38, and another portion of the seed layer 38 is covered by the sacrificial layer 172.

FIG. 1I depicts the removal of the sacrificial layer 172, thereby forming an exposed portion of seed layer 38, non-conducting layer 37, and substrate 12. The removal of the sacrificial layer 172 forms the chamber 70 defined by the thin film stack 30, the chamber layer 50, and the substrate 12.

FIG. 1J depicts the selective electroplating of the layer 54 having the predetermined surface property. As depicted, in this embodiment, the layer 54 conforms to a top surface of chamber layer 50, in addition to those areas of the chamber layer 50 and the seed layer 38 adjacent the chamber 70. It is to be understood that in this embodiment, a portion of the layer 54 may rest on the seed layer 38, in addition to, or in place of the non-conducting layer 37.

Together, FIGS. 1K through 1M depict the formation of the nozzle layer 60 and the final microfluidic architecture 10. FIG. 1K depicts the establishment of the second sacrificial layer 172' having a predetermined pattern, FIG. 1L depicts the electroplated nozzle layer 60, and FIG. 1M depicts the microfluidic architecture 10 after removal of the second sacrificial layer 172', such that the chamber 70 is open, and the nozzle layer 60 has an aperture 62 defined therein which leads to the chamber 70.

Figures 2A, 2B, 2H, 2I, 2J, 2K:
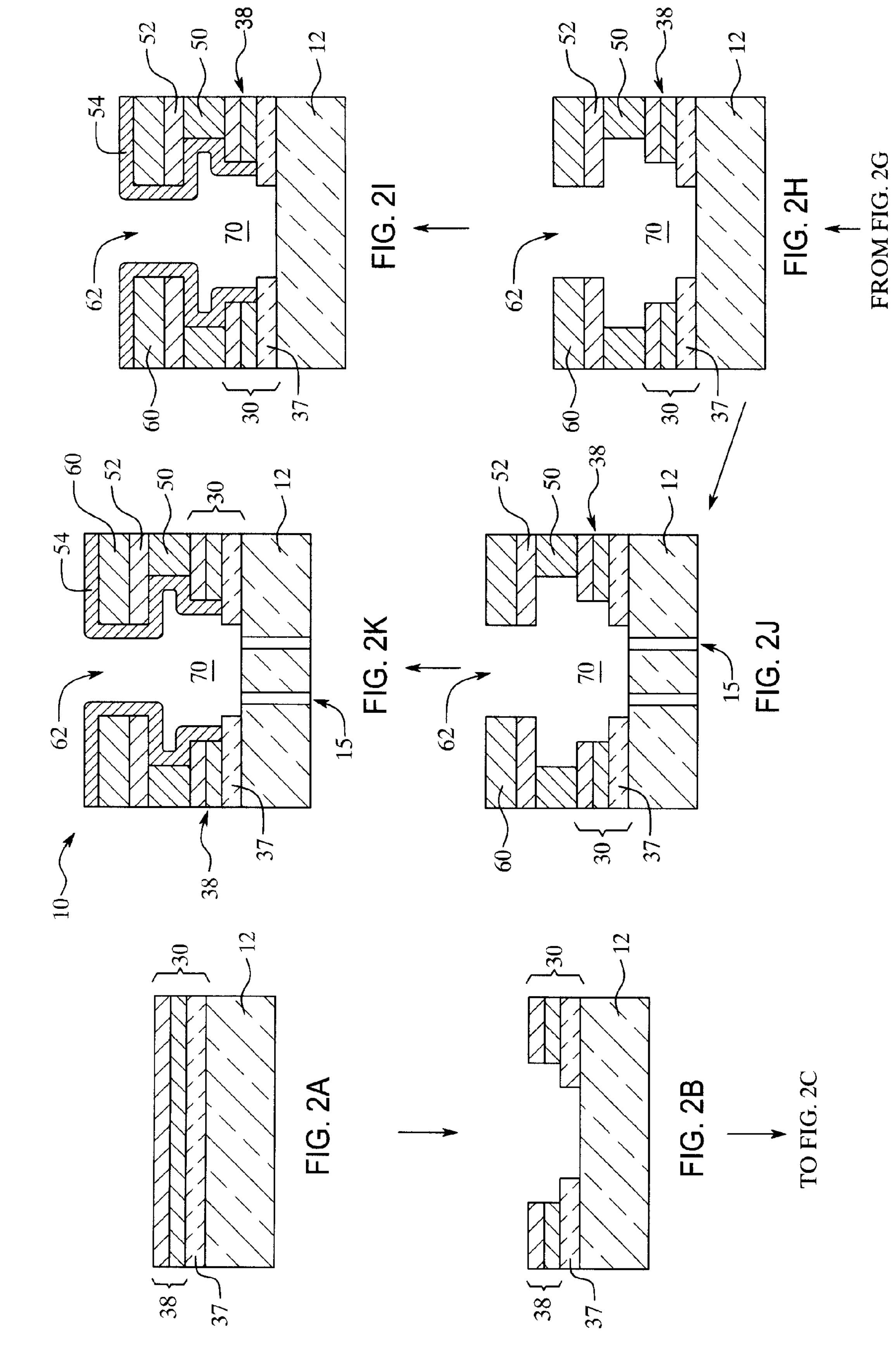
FIGS. 2A through 2K are semi-schematic cross-sectional views depicting another alternate embodiment of a method of forming embodiments of microfluidic architectures.

Referring now to FIGS. 2A through 2K, another embodiment of the method of forming a microfluidic architecture 10 is depicted. FIGS. 2A and 2B are similar to FIGS. 1A and 1B in that after the non-conducting layer 37 and the seed layer 38 are established, they are etched such that portions of the substrate 12 and the non-conducting layer 37 are exposed.

Figures 2C, 2D, 2E, 2F, 2G:
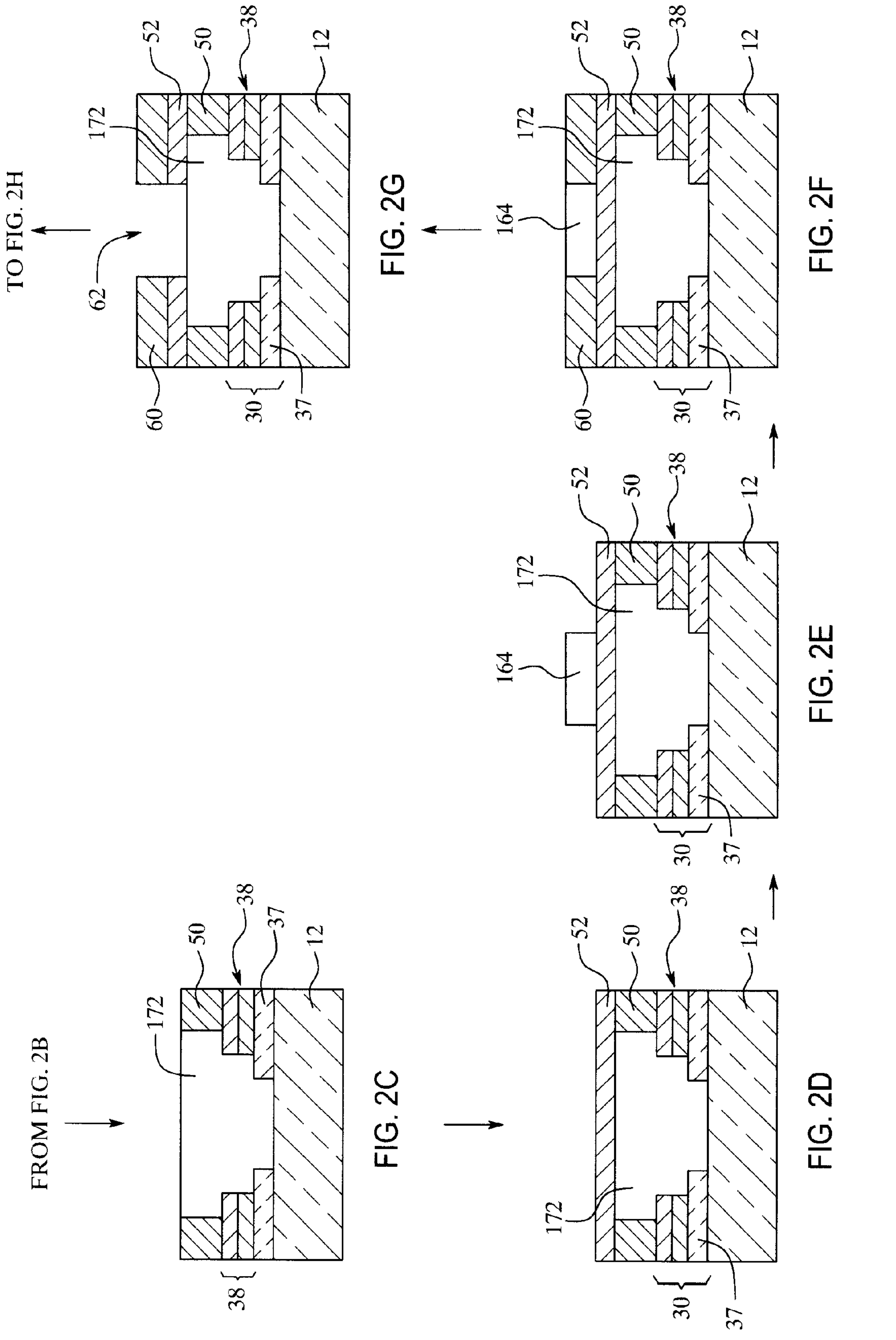

FIG. 2C depicts the addition of the chamber layer 50 and the sacrificial layer 172. While FIG. 2C depicts the chamber layer 50 established on a portion of the seed layer 38, the chamber layer 50 may be established on the entire seed layer 38 as described hereinabove.

Referring now to FIG. 2D, a second seed layer 52 may be established on the chamber layer 50 and the sacrificial layer 172. Second seed layer 52 is adapted or configured to promote adhesion between an overlying nozzle layer 60 and chamber layer 50. According to an example embodiment, seed layer 52 includes nickel or a nickel alloy. According to other embodiments, seed layer 52 may include any of the metals or metal alloys described above with respect to chamber layer 50. Seed layer 52 has a thickness ranging from approximately 500 to 1,000 angstroms according to one example embodiment, and a thickness ranging from approximately 500 to 3,600 angstroms (or greater than 3,600 angstroms) according to various other embodiments.

While seed layer 52 is shown in FIG. 2D as being formed as a single layer of material, according to other example embodiments, such a seed layer 52 may include more than one layer of material. For example, the seed layer 52 may be formed of a first layer comprising tantalum followed by a second layer comprising gold. According to such an embodiment, the tantalum may be utilized to promote adhesion of the gold layer to the underlying chamber layer (e.g., chamber layer 50).

Referring now to FIG. 2E, a second sacrificial layer/structure 164 is established on a predetermined portion of second seed layer 52 using, for example, photolithography masking and deposition methods. It is to be understood that the sacrificial layer 164 may be provided substantially overlying second seed layer 52 and patterned to form a sacrificial structure or pattern 164. Sacrificial structure 164 may include a photoresist material, such as a positive or negative photoresist material, and may be provided according to any suitable means (e.g., lamination, spinning, etc.). According to other example embodiments, other sacrificial materials may be used for the sacrificial material, such as tetraethylorthosilicate (TEOS), spin-on-glass, and polysilicon.

Sacrificial layer 164 may be formed of the same material as used to form sacrificial layer(s) 172, 172', or may differ therefrom. This sacrificial layer 164 is generally patterned such that the subsequently deposited nozzle layer 60 has an opening 62 defined therein.

FIG. 2F depicts the establishment of the nozzle layer 60. In an embodiment, the nozzle layer 60 is selectively electroplated such that it substantially overlies the second seed layer 52 in an area not covered by the sacrificial layer 164, for example, directly above the chamber layer 50. As such, the sacrificial material 164 acts as a mandrel or mold upon which and/or around which the nozzle layer 60 may be established.

Referring now to FIG. 2G and 2H, the nozzle opening 62 and the chamber 70 are formed. As shown in FIG. 2G, sacrificial layer 164 is removed to form an aperture 62 in the nozzle layer 60. The sacrificial layer 164 may be removed by any suitable method, including, but not limited to a solvent develop process, an oxygen plasma, an acid etch, or the like.

As also shown in FIG. 2G, a predetermined portion of second seed layer 52 underlying aperture 62 is removed to expose an upper or top surface of sacrificial layer 172. Removal of the predetermined portion of seed layer 52 may be accomplished using a wet or dry etch or other process. In a non-limitative example, the seed layer 52 is nickel, and a dilute nitric acid etch is utilized to remove the predetermined portion. In another non-limitative example, the seed layer 52 is gold, and a potassium iodide etch may be utilized to remove the predetermined portion. Any of a variety of etchants may be utilized that are suitable for removal of the portion of second seed layer 52 (e.g., depending, at least in part, on the composition of the layer 52, etc.).

After the top or upper surface of sacrificial layer 172 is exposed (as shown in FIG. 2G), sacrificial layer 172 is removed, as shown in FIG. 2H. Removal of sacrificial layer 172 may be accomplished using a similar method as described herein. As depicted in FIG. 2H, removal of the sacrificial layers 164, 172 results in the formation of chamber 70 and nozzle aperture 62.

Referring now to FIG. 2I, the layer 54 having the predetermined surface property is established on the nozzle layer 60 and on those portions of the second seed layer 52, the chamber layer 50 and the seed layer 38 that are exposed to the chamber 70.

The layer 54 may be selectively electroplated in the interior of the chamber 70 via the aperture 62. It is to be understood that the electroplating process may be performed such that the layer 54 does not contact the substrate 12 and comes to rest on the non-conducting layer 37.

In an alternate embodiment as depicted in FIGS. 2J and 2K, one or more feed channel(s) 15 may be formed in the substrate 12 prior to the establishment of the layer 54. The feed channels 15 may extend from an exterior of the substrate 12 through to the chamber 70. It is to be understood that these feed channels 15 may be used, in addition to the aperture 62, for selectively electroplating the layer 54 on those areas adjacent the chamber 70. Without being bound to any theory, it is believed that the combination of the aperture 62 and the feed channels 15 allows for substantially better mass transport of the layer 54 during the electroplating process.

It is to be further understood that the aperture 62 and the feed channels 15 may be used as an ingress and egress for fluids in and out of the chamber 70.

Referring now to FIGS. 3A through 3D, four alternate embodiments (formed by the methods previously described) of the microfluidic architecture 10 are depicted. Each of the embodiments generally includes the substrate 12, the thin film stack 30, the chamber layer 50, the layer 54 having a predetermined surface property, the nozzle layer 60, and nozzle aperture 62. It is to be understood that in the embodiments, the chamber 70 and/or the nozzle aperture 62 are adapted to contain fluids therein.

Figure 3A:
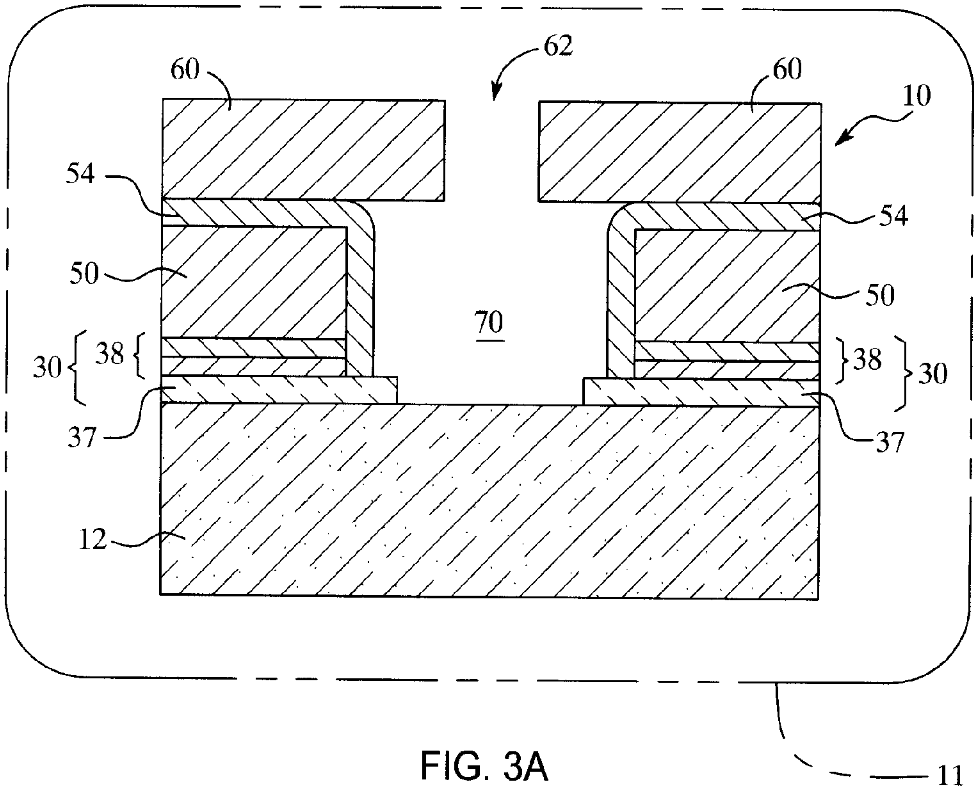
FIGS. 3A through 3D are semi-schematic cross-sectional views of alternate embodiments of microfluidic architectures formed by the processes depicted in FIGS. 1A-1M and FIGS. 2A-2I.

The embodiment depicted in FIG. 3A illustrates the chamber layer 50 established on substantially the entire seed layer 38, such that the layer 54 is adjacent the top of the chamber layer 50 and those portions of the chamber layer 50 and the seed layer 38 that are exposed to the chamber 70. In this embodiment, the layer 54 may come to rest on the non-conductive layer 37, and may not be exposed to the substrate 12.

Figure 3B:
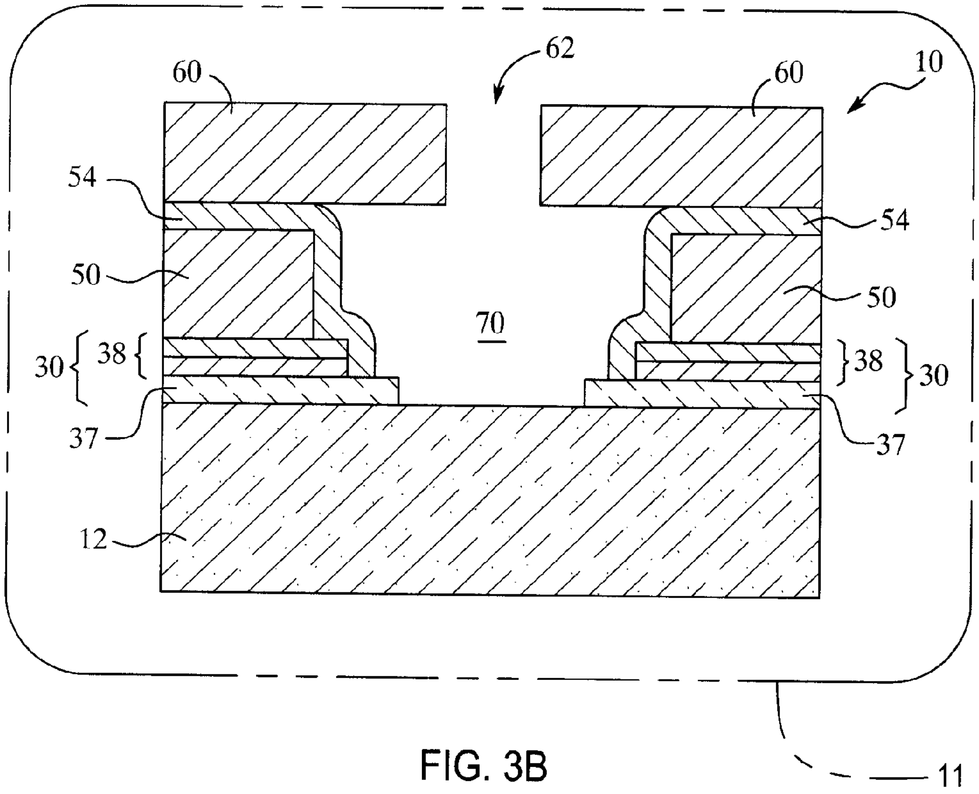

The embodiment depicted in FIG. 3B illustrates the chamber layer 50 established on a portion of the seed layer 38, such that the layer 54 is again adjacent the top surface of the chamber layer 50 and those portions of the chamber layer 50 and the seed layer 38 that are exposed to the chamber 70. In this embodiment, however, the layer 54 may rest on the seed layer 38 in addition to, or in place of, the non-conductive layer 37. It is to be understood that the layer 54 may not be exposed to the substrate 12.

Figure 3C:
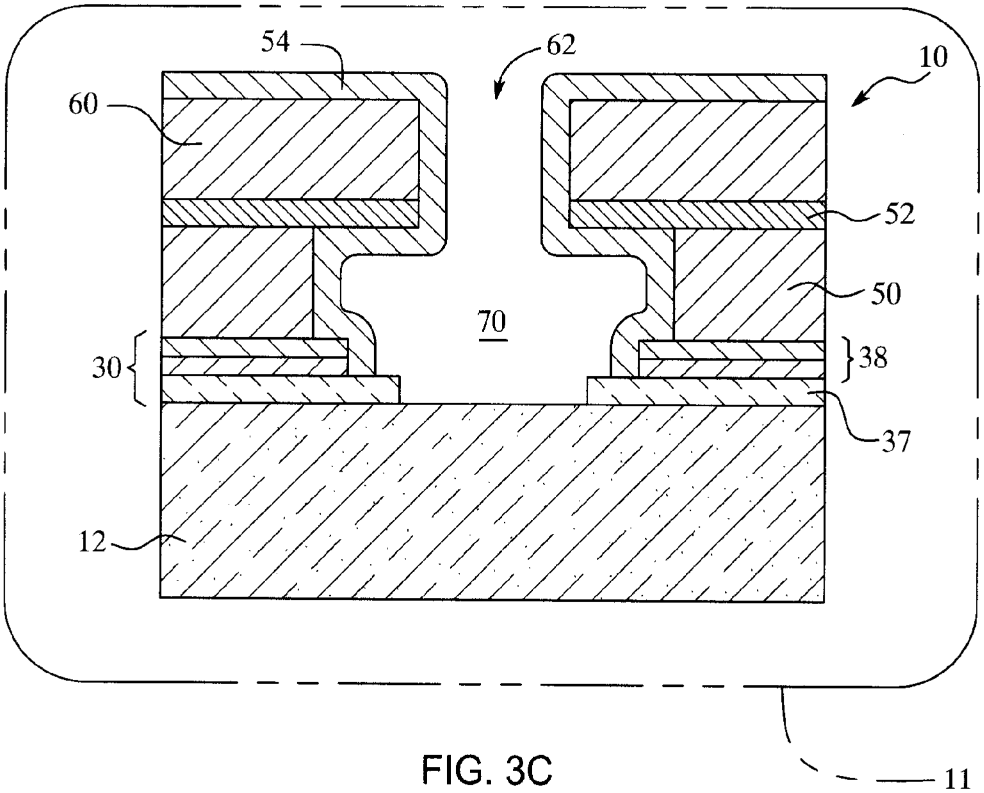

The embodiment depicted in FIG. 3C illustrates a second seed layer 52 established between the chamber layer 50 and the nozzle layer 60. The layer 54 is electroplated such that it is adjacent the top surface of the nozzle layer 60 and those portions of the second seed layer 52, the chamber layer 50 and the seed layer 38 that are exposed to the chamber 70. In this embodiment, the layer 54 may rest on the seed layer 38 in addition to the non-conductive layer 37. It is to be understood that the layer 54 may not be exposed to the substrate 12.

Figure 3D:
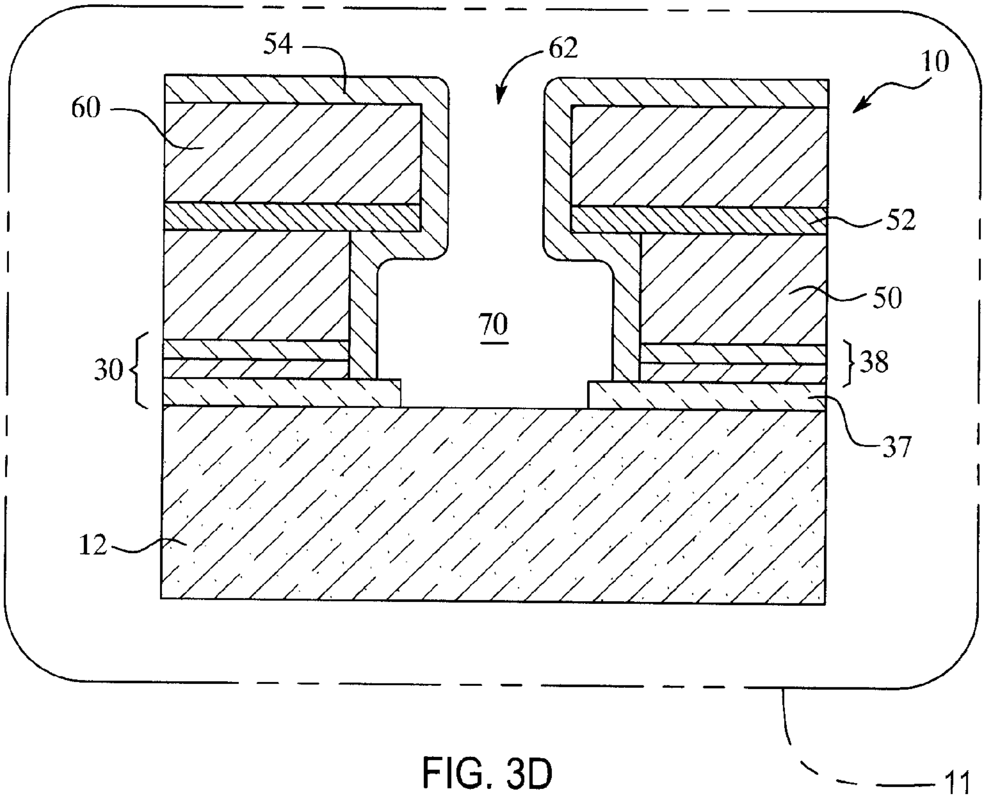

The embodiment depicted in FIG. 3D illustrates the second seed layer 52 established between the chamber layer 50 and the nozzle layer 60. The layer 54 is electroplated such that it is adjacent the top surface of the nozzle layer 60 and those portions of the second seed layer 52, the chamber layer 50 and the seed layer 38 that are exposed to the chamber 70. In this embodiment, the chamber layer 50 is established on the entire seed layer 38, such that layer 54 rests on the non-conductive layer 37. The layer 54 may not be exposed to the substrate 12.

It is to be understood that the non-conductive layer 37 electrically isolates the seed layer 38 from the underlying substrate 12 or films. Without being bound to any theory, it is believed that the isolation of the seed layer 38 and the chamber layer 50 substantially prevents the layer 54 from plating onto other exposed surfaces of the substrate 12.

The microfluidic architectures 10 depicted in FIGS. 3A through 3D are capable of being operatively disposed in various devices 11, including electronic devices (non-limitative examples of which include fuel injectors (for use in many devices, including but not limited to internal combustion engines), ink-jet printheads, microfluidic biological devices, pharmaceutical devices, and/or the like).

According to an example embodiment, a method or process for producing or manufacturing a printhead (e.g., a thermal ink jet printhead) includes utilizing a sacrificial structure as a mold or mandrel for a metal or metal alloy that is deposited thereon, after which the sacrificial structure is removed. The sacrificial structure defines a chamber and manifold for storing ink and a nozzle in the form of an aperture or opening (e.g., an orifice) through which ink is ejected from the printhead. According to an example embodiment, the metal or metal alloy is formed using a metal deposition process, non-exclusive and nonlimiting examples of which include electrode position processes, electroless deposition processes, physical deposition processes (e.g., sputtering), and chemical vapor deposition processes.

One advantageous feature of utilizing metals to form the nozzle and chamber layers of the printhead is that such metals may be relatively resistant to inks (e.g., high solvent content inks) that may degrade or damage structures conventionally formed of polymeric materials and the like. Another advantageous feature is that such metal or metal alloy layers may be subjected to higher operating temperatures than can conventional printheads. For example, polymeric materials used in conventional printheads may begin to degrade at between 70° C. and 80° C. In contrast, metal components will maintain their integrity at much higher temperatures.

Figure 4:
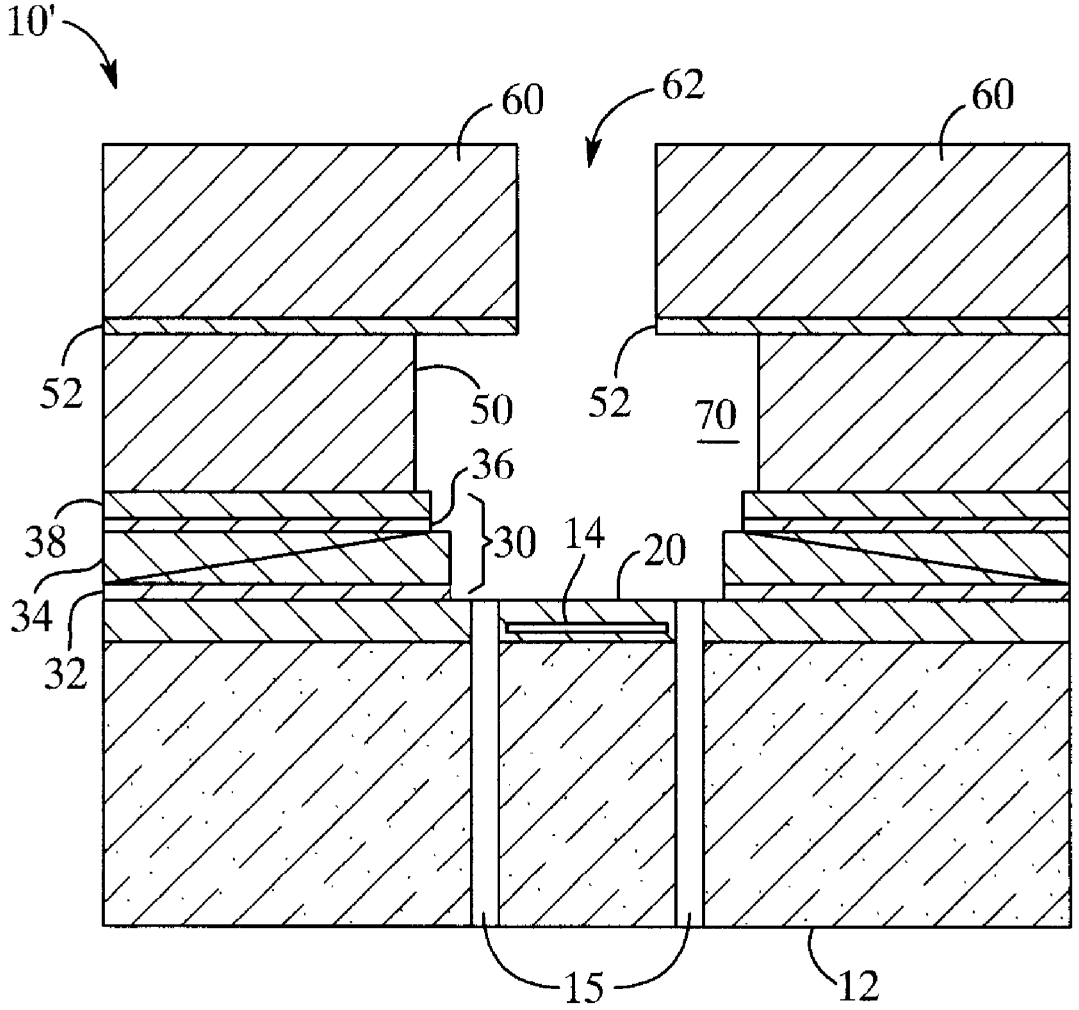
FIG. 4 is a semi-schematic cross-sectional view of a portion of a printhead according to an example embodiment.

FIG. 4 is a semi-schematic cross-sectional view of a portion of a microfluidic architecture 10, and in particular a thermal ink jet printhead 10' according to an example embodiment. Printhead 10' includes a chamber 70 that receives ink from ink feed channels 15. Ink is ejected from chamber 70 through an opening 62, which in one embodiment is a nozzle, onto a print or recording medium such as paper when printhead 10' is in use.

Printhead 10' includes a substrate 12 such as a semiconductor or silicon substrate. According to other embodiments, any of a variety of semiconductor materials may be used to form substrate 12. For example, a substrate may be made from any of a variety of semiconductor materials, including silicon, silicon-germanium, (or other germanium-containing materials), or the like. The substrate may also be formed of glass (SiO2), according to other embodiments.

A member or element in the form of a resistor 14 is provided above substrate 12. Resistor 14 is configured to provide heat to ink contained within chamber 70 such that a portion of the ink vaporizes to form a bubble within chamber 70. As the bubble expands, a drop of ink is ejected from opening 62. Resistor 14 may be electrically connected to various components of printhead 10' such that resistor 14 receives input signals or the like to selectively instruct resistor 14 to provide heat to chamber 70 to heat ink contained therein.

According to an example embodiment, resistor 14 includes $WSi_xN_y$. According to various other example embodiments, the resistor 14 may include any of a variety of materials, including, but not limited to TaAl, $TaSi_xN_y$, and $TaAlO_x$.

A layer of material 20 (e.g., a protective layer) is provided substantially overlying resistor 14. Protective layer 20 is intended to protect resistor 14 from damage that may result from cavitation or other adverse effects due to any of a variety of conditions (e.g., corrosion from ink, etc.). According to an example embodiment, protective layer 20 includes tantalum or a tantalum alloy. According to other example embodiments, protective layer 20 may be formed of any of a variety of other materials, such as tungsten carbide (WC), tantalum carbide (TaC), and diamond like carbon.

The resistor 14 may be established by depositing a resistor material on the substrate 12 and then patterning the material using photolithography and etching. Conductor traces (which connect the resistor 14 to the drive and firing electronics) may then be established via deposition, patterning, and etching. Further, the resistor protective layer 20 may then be deposited over the resistor 14 and conductor traces, and then patterned and etched. It is to be understood that the resistor protective layer 20 may be composed of a single material or may be a combination of multiple thin film layers.

A plurality of thin film layers 30 (a non-limitative example of which is thin film stack 30 described hereinabove) are provided substantially overlying protective layer 20. According to the example embodiment shown in FIG. 4, thin film layers 30 comprise four layers 32, 34, 36, and 38. It is to be understood that the thin film layers 30 may include the non-conducting layer 37 and the seed layer 38 as previously described. According to other embodiments, a different number of layers (e.g., greater than four layers, etc.) may be provided. Layers 20, 32, 34, 36, and 38 (FIG. 4) may protect the substrate from inks used during operation of the printhead and/or act as adhesion layers or surface preparation layers for subsequently deposited material. According to other example embodiments, additional layers of material may be provided intermediate or between layer 20 and substrate 12. Such additional layers may be associated with logic and drive electronics and circuitry that are responsible for activating or firing resistor 14.

As shown in FIG. 4, layer 38 is seed layer 38 (previously described) that may be used as a cathode during electrodeposition of overlying metal layers.

The various layers (e.g., layers 32, 34, 36, 38, and any additional layers provided intermediate layer 20 and substrate 12) can include conductors such as gold, copper, titanium, aluminum-copper alloys, and titanium nitride; tetraethylorthosilicate (TEOS) and borophosphosilicate glass (BPSG) layers provided for promoting adhesion between underlying layers and subsequently deposited layers and for insulating underlying metal layers from subsequently deposited metal layers; silicon carbide and $Si_xN_y$ for protecting circuitry in the printhead 10' from corrosive inks; silicon dioxide, silicon, and/or polysilicon used for creating electronic devices such as transistors and the like; and any of a variety of other materials.

Chamber layer 50 is provided substantially overlying thin film layers 30. It is to be understood that the chamber layer 50 may be formed of any suitable material and by any suitable process, examples of which are previously described.

In an embodiment, the layer 54 having a predetermined surface property may be established on the chamber layer 50 as previously described. In an alternate embodiment, second seed layer 52 is provided substantially overlying chamber layer 50.

Nozzle layer 60 may be provided substantially overlying chamber layer 50 and seed layer 52, or overlying chamber layer 50 and layer 54. In another embodiment, nozzle layer 60 is provided substantially overlying chamber layer 50 and seed layer 52 and is substantially covered by layer 54. According to an example embodiment, nozzle layer 60 has a thickness of between approximately 5 and 100 micrometers. According to other example embodiments, nozzle layer 60 has a thickness ranging between approximately 1 and 30 micrometers.

FIGS. 5A through 5G are semi-schematic cross-sectional views of a portion of a thermal ink jet printhead 10' similar to that shown in FIG. 5 showing the steps of a manufacturing process according to an example embodiment.

Figure 5A:
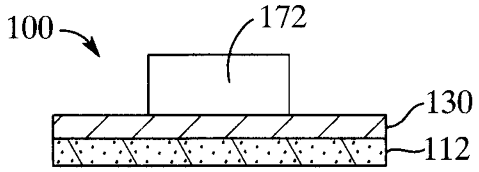
FIGS. 5A-5G are semi-schematic cross-sectional views of a portion of a printhead similar to that shown in FIG. 4 showing the steps of a manufacturing process according to an example embodiment.

As shown in FIG. 5A, a thin film layer 130 is provided above a substratum 112. Thin film layer 130 may be similar to thin film layer 30 shown in FIG. 4, and may include a seed layer and any of a number of additional thin film layers such as those described with respect to FIG. 4. Thin film layer 130 is provided substantially overlying a resistor and protective layer (not shown) such as that shown in FIG. 4 as resistor 14 and protective layer 20, as are known in the art.

While thin film layer 130 is shown as a continuous layer, a portion of thin film layer 130 may be removed above the resistor, as shown in the example embodiment shown in FIG. 4. Removal of a portion of thin film layer 130 may occur either before or after the processing steps shown in FIGS. 5A through 5G. For example, where such a portion is removed before the processing steps described in FIGS. 5A through 5G, photoresist material may fill the removed portion during processing prior to its subsequent removal to form a chamber and nozzle such as chamber 70 and opening 62 such as those shown in FIG. 4. It should also be noted that the removal of a portion of similar thin film layers 230 and 330 may be performed before or after the process steps shown and described with respect to FIGS. 6A-6E and 7A-7D, respectively. For simplicity, each of the embodiments shown and FIGS. 5A-5G, 6A-6E and 7A-7D will be described as if removal of a portion of the film layers 130, 230 and 330 occurs after the formation of the chamber and nozzle.

As shown in FIG. 5A, a sacrificial material is provided substantially overlying thin film layer 130 and patterned to form a sacrificial structure or pattern 172. Sacrificial structure 172 may comprise a photoresist material, such as a positive or negative photoresist material, and may be provided according to any suitable means (e.g., lamination, spinning, etc.). According to one example embodiment, the sacrificial material used to form sacrificial structure 172 is a positive photoresist material such as SPR 220, commercially available from Rohm and Haas of Philadelphia, Pa. According to another example embodiment, the sacrificial material is a negative photoresist material such as a THB 151N material commercially available from JSR Micro of Sunnyvale, Calif. or an SU8 photoresist material available from MicroChem Corporation of Newton, Mass.

According to other example embodiments, other sacrificial materials may be used for the sacrificial material, such as tetraethylorthosilicate (TEOS), spin-on-glass, and polysilicon. One advantageous feature of utilizing a photoresist material is that such material may be relatively easily patterned to form a desired shape. For example, according to an example process, a layer of photoresist material may be deposited or provided substantially overlying thin film layer 130 and subsequently exposed to radiation (e.g., ultraviolet (UV) light) to alter (e.g., solubize or polymerize) a portion of the photoresist material. Subsequent removal of exposed or nonexposed portions of the photoresist material (e.g., depending on the type of photoresist material utilized) will result in a relatively precise pattern of material.

Figure 5B:
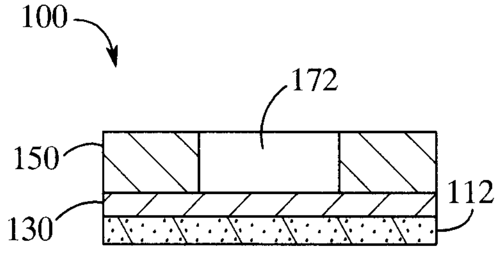

Subsequent to the formation or patterning of sacrificial structure 172, a layer 150 of metal is provided in FIG. 5B substantially overlying thin film layer 130 in areas not covered by sacrificial structure 172. In this manner, sacrificial structure 172 acts as a mandrel or mold around which metal may be deposited. Sacrificial structure 172 also acts to mask a portion of the underlying layers from having metal of layer 150 provided therein. While layer 150 is shown as being deposited such that its top surface is substantially planar with the top surface of sacrificial structure 172, layer 150 may be deposited to a level higher than the top surface of sacrificial structure 172 and polished or etched such that it is coplanar with the top surface of sacrificial structure 172.

According to an example embodiment, layer 150 is intended for use as a chamber layer such as chamber layer 50 shown in FIG. 4. Accordingly, layer 150 may be formed from any of a variety of metals and metal alloys such as those described above with respect to chamber layer 50. For example, according to one example embodiment, layer 150 comprises nickel or a nickel alloy. One method by which nickel may be provided for layer 150 (or for any other layer described herein which may include nickel) is the use of a Watts bath containing nickel sulphate, nickel chloride and boric acid in aqueous solution with organic additives (e.g., saccharine, aromatic sulphonic acids, sulfonamides, sulphonimides, etc.).

Layer 150 is deposited using an electrodeposition process according to an example embodiment. According to one example embodiment, layer 150 is deposited in a direct current (DC) electrodeposition process using Watts nickel chemistry. In such an embodiment, electrodeposition is conducted in a cup style plating apparatus. According to other embodiments, electrodeposition can be carried out in a bath style plating apparatus. The Watts nickel chemistry is composed of nickel metal, nickel sulfate, nickel chloride, boric acid and other additives that have a compositional range from 1 milligrams per liter to 200 grams per liter for each component.

According to the example embodiment, a resist pattern is first prepared on the wafer surface (which may include any of a variety of thin film layers such as layers 32, 34, 36, and 38 shown in FIG. 4), after which the wafer is prepared for deposition by dipping for 30 seconds in sulfuric acid. Other acids or cleaning techniques such as plasma etching or UV ozone cleaning may be utilized in other embodiments. The wafer is then placed in the plating apparatus and electrodeposition begins by setting the DC power source to plate at a current density of approximately 3 amperes per square decimeter (amps/dm2). In other embodiments, electrodeposition can utilize a current density range of between approximately 0.1 to 10 amps/$dm^2$ depending on the plating chemistry used and the desired plating rates (higher current densities can result in higher plating rates). These conditions can be used for deposition of the chamber and nozzle layers described with respect to the embodiment shown in FIGS. 5A-5F and in either of the embodiments illustrated in FIGS. 6A-6E and FIGS. 7A-7D.

According to another example embodiment, layer 150 may be provided in an electroless deposition process or any other process by which metal may be deposited onto thin film layer 130 (e.g. physical vapor deposition techniques such as a sputter coating, chemical vapor deposition techniques, etc.).

Figure 5C:
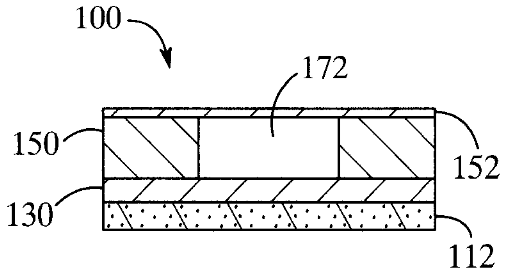

As shown in FIG. 5C, a layer of metal 152 (e.g., a seed layer) is provided substantially overlying both sacrificial structure 172 and layer 150. According to another example embodiment, layer 152 may be omitted. Layer 152 may be formed of similar materials as described with respect to layer 52 with regard to FIG. 4. Layer 152 may be deposited in any suitable process (e.g., physical vapor deposition, evaporation, electroless deposition, etc.). As described above with respect to layer 52, layer 152 may comprise a single layer of material or multiple layers of material (e.g., a first layer comprising tantalum and a second layer comprising gold, etc.).

Figure 5D:
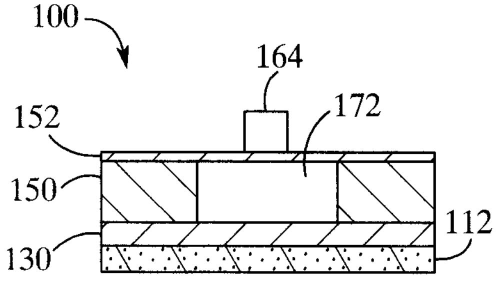

In FIG. 5D, sacrificial structure 164 is provided substantially overlying layer 152 and aligned with sacrificial structure 172 using conventional photolithography masking and deposition methods. Sacrificial structure 164 may be formed of the same material as used to form sacrificial structure 172, or may differ therefrom. As with sacrificial structure 172, sacrificial structure 164 is formed by photolithographic methods from a layer of sacrificial material (e.g., positive or negative photoresist, etc.).

Figure 5E:
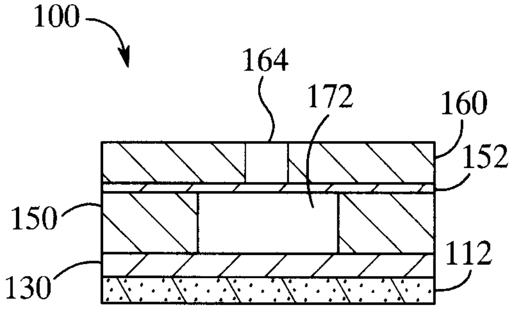

In FIG. 5E, a layer 160 of metal (similar to that provided as nozzle layer 60 in FIG. 4) is provided substantially overlying layer 152 in areas not covered by sacrificial structure 164. Layer 160 may be formed of a material similar to that used for nozzle layer 60 described with respect to FIG. 4.

Figure 5F:
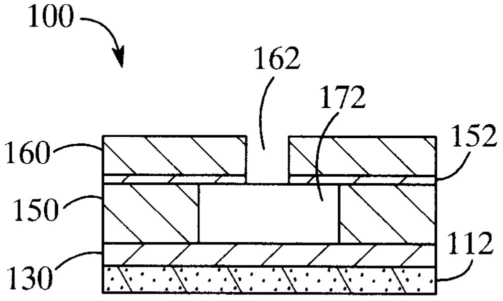
Figure 5G:
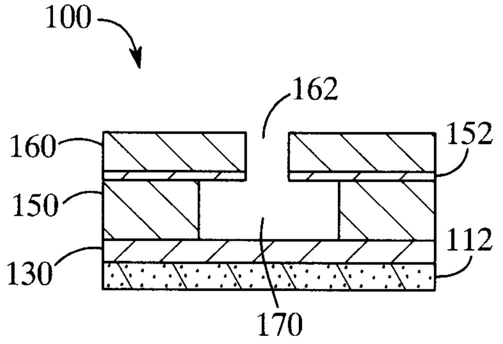

A chamber 170 and nozzle 162 are formed as shown in FIGS. 5F and 5G. As shown in FIG. 5F, sacrificial structure 164 is removed to form a nozzle 162. According to an example embodiment, sacrificial structure 164 is removed using any of a variety of methods. For example, sacrificial structure 164 may be removed with a solvent develop process, an oxygen plasma, an acid etch, or any of a variety of other processes suitable for removal of sacrificial structure 164.

As also shown in FIG. 5F, a portion of layer 152 underlying nozzle 162 is removed to expose an upper or top surface of sacrificial structure 172. Removal of the portion of layer 152 may be accomplished using a wet or dry etch or other process. According to an example embodiment in which layer 152 is formed of nickel or a nickel alloy, a dilute nitric acid etch may be utilized. According to another example embodiment in which gold or a gold alloy is used to form layer 152, a potassium iodide etch may be utilized. Any of a variety of etchants may be utilized that are suitable for removal of the portion of layer 152 (e.g., depending on the composition of layer 152, etc.). One consideration that may be utilized in choosing an appropriate etchant is the goal of avoiding damage to the metal utilized to form layers 150 and 160.

After the top or upper surface of sacrificial structure 172 is exposed (as shown in FIG. 5F), sacrificial structure 172 is removed as shown in FIG. 5G. Removal of sacrificial structure 172 may be accomplished using a similar method as described above with respect to sacrificial structure 164.

As shown in FIG. 5G, removal of sacrificial structures 164 and 172 and etching of a portion of layer 152 results in a structure including a chamber 170 for storage of ink for printhead 100 and a nozzle 162 for ejection of ink from chamber 170. While FIG. 5G shows chamber 170 provided substantially overlying thin film layers 130, all or a portion of thin film layers 130 underlying chamber 170 may be removed in a subsequent etching step. According to another example embodiment, thin film layers 130 may be etched prior to deposition of sacrificial structures 172 and 164. Other components of printhead 100 may also be formed prior to or after the formation steps described with respect to FIGS. 5A through 5G. For example, one or more ink feed channels 15 may be formed to provide ink to chamber 170 prior or subsequent to the formation of the structure shown in FIG. 5G.

FIGS. 6A through 6E are semi-schematic cross-sectional views of a portion of a thermal ink jet printhead 200 similar to that shown in FIG. 4 showing the steps of a manufacturing process according to another example embodiment. In contrast to the example embodiment described with respect to FIGS. 5A through 5G, the example embodiment shown in FIGS. 6A through 6E utilizes a sacrificial structure that is formed prior to metal deposition used to form a chamber layer and a nozzle layer. In this embodiment, a metal layer such as a seed layer 152 (see, e.g., FIGS. 5A through 5F) is not required between a chamber layer and a nozzle layer.

Figure 6A:
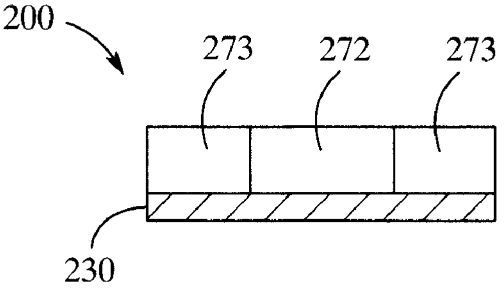
FIGS. 6A-6E are semi-schematic cross-sectional views of a portion of a printhead similar to that shown in FIG. 4 showing the steps of a manufacturing process according to another example embodiment.
Figure 6B:
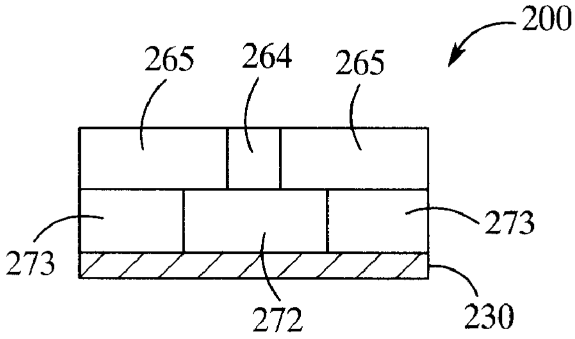

As shown in FIG. 6A, a first layer of sacrificial material is provided or formed substantially overlying a thin film layer 230 similar to that described above with respect to thin film layer 130. Once deposited, the first layer of sacrificial material will be patterned to define regions to be removed and regions to remain (i.e., that will be used to form a portion of a sacrificial structure). According to an example embodiment in which a negative photoresist material is provided substantially overlying thin film layer 230, the photoresist material is patterned by exposing the photoresist material to radiation such as ultraviolet light to form exposed portion 272 and unexposed portions 273. In this embodiment, exposed portions 272 polymerize in response to the exposure to ultraviolet light, and will act as a portion of a sacrificial structure to be used in the formation of a chamber and nozzle (see FIG. 6E). According to another embodiment, in which a positive photoresist is utilized, portion 272 may be unexposed and portions 273 may be exposed to ultraviolet light.

A second layer of sacrificial material is provided substantially overlying the first layer of sacrificial material and patterned to define at least one portion or region to be removed and to define a portion or region that will remain to form another portion of a sacrificial structure. Patterning may be accomplished in a manner similar to that described with reference to the first layer of sacrificial material, such as by exposing a portion of the second layer of sacrificial material to radiation such as ultraviolet light. In this manner, an exposed portion 264 and an unexposed portion 265 (or vice-versa where a positive photoresist material is utilized) is formed in the second layer of sacrificial material.

Figure 6C:
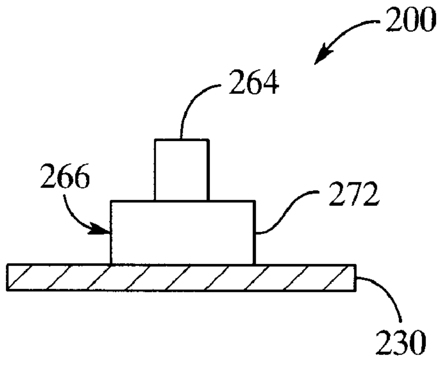

Subsequent to the exposure of portions of the first and second layers of sacrificial material, portions of each of the first and second layers are removed to form a sacrificial structure that may be used to define a chamber and nozzle for the printhead. In FIG. 6C, portions 273 and 265 are removed according to an example embodiment. The removal of portions of the photoresist results in the formation of a sacrificial structure 266 having a top or upper portion 264 to be used in the formation of a nozzle for printhead 200 and a bottom or lower portion 272 to be used in the formation of an ink chamber and ink manifold for printhead 200.

According to an example embodiment, the first and second layers of sacrificial materials used to form portions 264 and 272 are formed of the same material and are deposited in two separate deposition steps. In another example, the first and second layers of sacrificial materials are formed of a single layer of material formed in a single deposition step. In yet another example, the first and second layers of sacrificial materials used to form portions 264 and 272 are formed of different materials (e.g., a positive photoresist for one layer and a negative photoresist for the other layer).

Figure 6D:
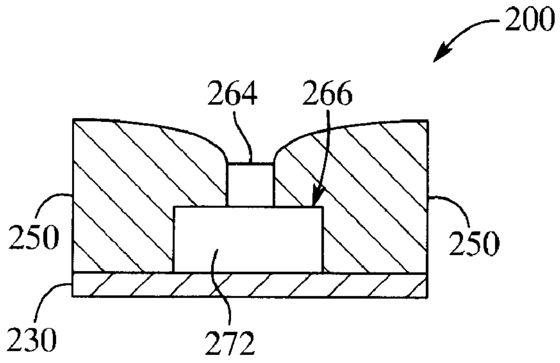

As shown in FIG. 6D, a layer 250 of metal is provided or deposited substantially overlying the thin film layer 230 and adjacent to portions 264 and 272 of sacrificial structure 266. According to an example embodiment, metal used to form layer 250 may be material similar to that described with respect to chamber layer 50 and nozzle layer 60 described with regard to FIG. 4. Metal used to form layer 250 may be provided using any acceptable deposition method, including electrodeposition, electroless deposition, physical vapor deposition, chemical vapor deposition, etc. According to an example embodiment in which the metal used to form layer 250 is deposited in a direct current electrodeposition (DC) process, the metal is provided such that it is level or slightly below the level of the top or upper surface of portion 264 of the sacrificial structure 266. As shown in FIG. 6D, the metal used to form layer 250 increases in thickness at distances away from portion 264. One reason for this is that as layer 250 thickens beyond the height of portion 272, the metal is deposited both vertically and laterally on top of portion 272, thus slowing the vertical deposition rate in the vicinity of portion 272. Once the lateral deposition of layer 250 stops, the deposition rate of layer 250 is the same everywhere (including substantially overlying portion 272 and adjacent portion 264).

Figure 6E:
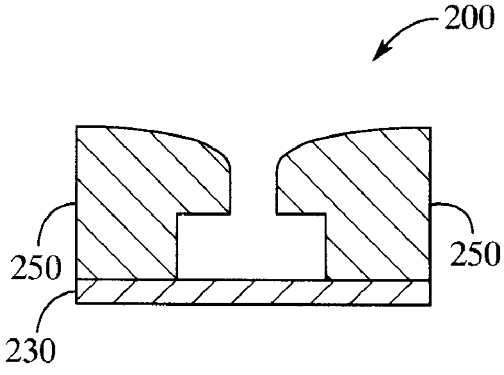

As shown in FIG. 6E, sacrificial structure 266 is removed after layer 250 is provided. Removal of sacrificial structure 266 may be accomplished using methods similar to those described above with respect to sacrificial structures 164 and 172. As described above with respect to FIGS. 5A through 5F, other processing steps may be utilized either prior or subsequent to the formation of the structure shown in FIG. 6E.

According to an example embodiment, the top or upper surface of metal layer 250 may be planarized using a chemical mechanical polish technique or other similar technique. One advantageous feature of performing such a planarization step is that the entire surface of printhead 200 will have a relatively flat or planar characteristic around the nozzle.

FIGS. 7A to 7D are semi-schematic cross-sectional views of a portion of a printhead 300 similar to that shown in FIG. 4 showing the steps of a manufacturing process according to another example embodiment. Similar to the embodiment shown with respect to FIGS. 6A to 6E, one feature of the embodiment shown in FIGS. 7A to 7D is the formation of an entire sacrificial structure prior to the deposition of metal used to form a printhead structure.

Figure 7A:
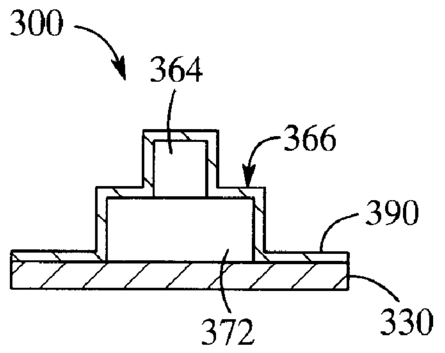
FIGS. 7A-7D are semi-schematic cross-sectional views of a portion of a printhead similar to that shown in FIG. 4 showing the steps of a manufacturing process according to a further example embodiment.

As shown in FIG. 7A, a sacrificial structure 366 having a top or upper portion 364 and a bottom or lower portion 372 is formed substantially overlying a thin film layer 330. As with structures 264 and 272 described above with respect to FIGS. 6A to 6E, top portion 364 is utilized to form a nozzle and bottom portion 372 is utilized to form an ink chamber or ink manifold. The sacrificial structure 366 may be formed in a manner similar to that described above with respect to FIGS. 6A to 6E (i.e., utilizing the successive deposition, patterning and removal of a portion of two separate photoresist layers).

As also shown in FIG. 7A, a layer 390 of metal is provided substantially overlying the sacrificial structure 366 and the surface of thin film layers 330 not covered by sacrificial structure 366. Any of a variety of deposition methods may be used to form layer 390, including physical vapor deposition, evaporation, chemical vapor deposition, electrodeposition, electroless deposition, autocatalytic plating, etc. Layer 390 is intended to act as a seed layer for overlying metal layers used to form the printhead structure. According to an example embodiment, layer 390 may have a thickness of between approximately 500 and 3,000 angstroms. According to other example embodiments, layer 390 may have a thickness of between 500 angstroms and 2 micrometers.

Layer 390 may include a relatively inert metal such as gold, platinum and/or gold and platinum alloys. According to other embodiments, layer 390 may include palladium, ruthenium, tantalum, tantalum alloys, chromium and/or chromium alloys.

Figure 7B:
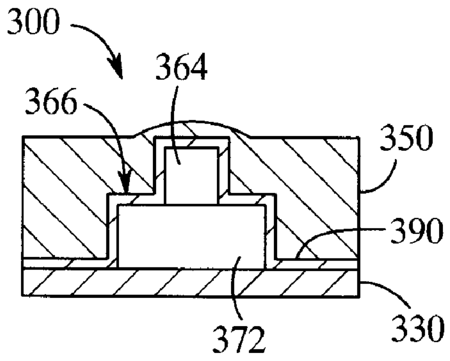

As shown in FIG. 7B, a layer 350 of metal is provided or deposited substantially overlying layer 390 (i.e., substantially overlying and around sacrificial structure 366 and substantially overlying portions of thin film layers 330 not covered by sacrificial structure 366). The material used to form layer 350 may be similar to that used to form chamber layer 50 and the nozzle layer 60 as shown in FIG. 4. As shown in FIG. 7B, a portion of the metal used to form layer 350 extends substantially overlying a top surface of a top portion 364 of sacrificial structure 366.

Figure 7C:
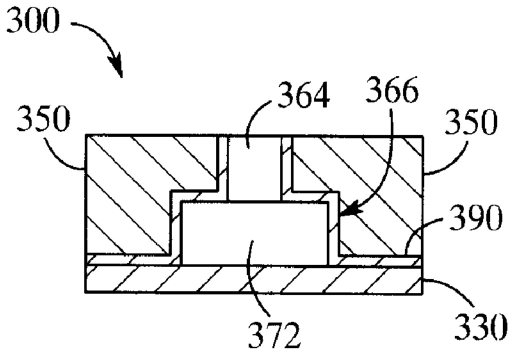

According to an example embodiment shown in FIG. 7C, a planarization process is used to planarize the top surface of layer 350 and sacrificial structure 366. According to an example embodiment, a chemical mechanical polish technique is utilized to planarize the top surface of layer 350 and sacrificial structure 366.

Figure 7D:
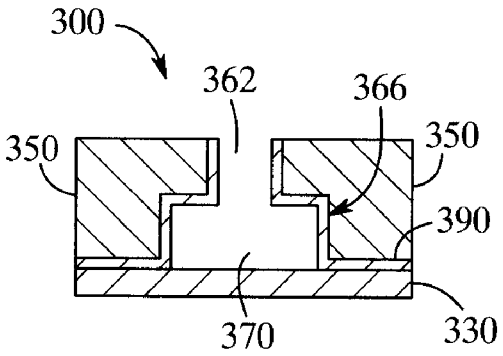

Sacrificial structure 366 is removed as shown in FIG. 7D using methods similar to those described above with respect to sacrificial structure 266. The result is the formation of a chamber 370 and a nozzle 362 similar to chamber 70 and opening 62 shown in FIG. 4. As described above, additional processing steps may be performed prior or subsequent to the formation of the structure shown in FIG. 7D.

As an optional step (not shown), a layer of metal similar or identical to that used to form layer 390 may be provided substantially overlying a top surface of layer 350. One advantageous feature of such a configuration is that layer 350 may be effectively encapsulated or clad to prevent damage from inks or other liquids. In this manner, relatively inert metals (e.g., gold, platinum, etc.) may be utilized to form the wall or surface that is in contact with ink used by the printhead, while a relatively less expensive material (e.g., nickel) may be used as a "filler" material to form the structure for the chamber and nozzle.

Figure 8:
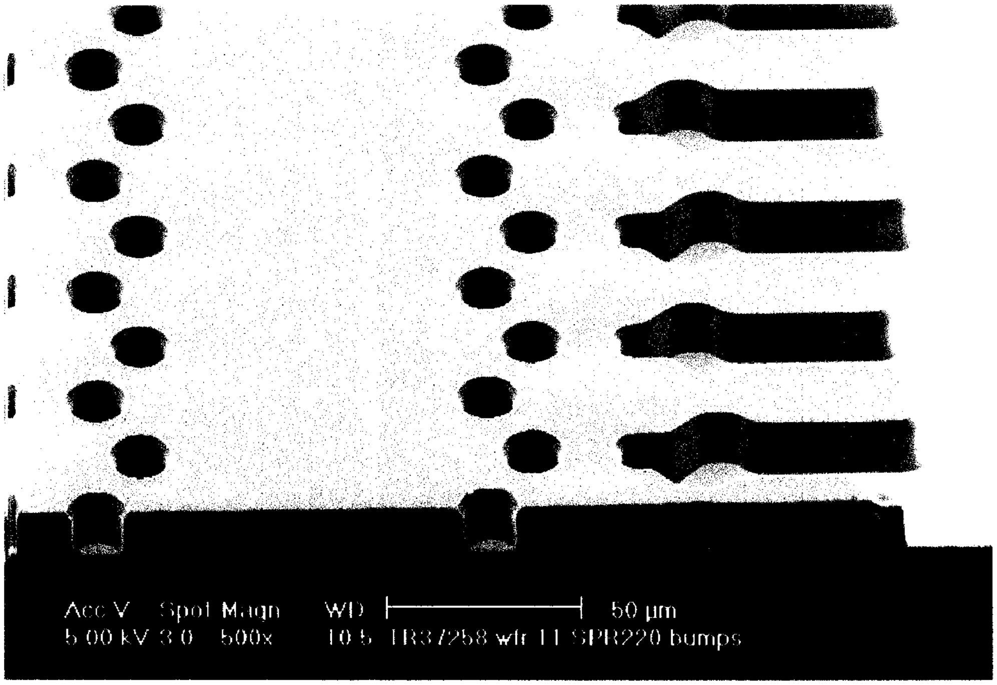
FIG. 8 is a scanning electron micrograph showing a sacrificial layer formed of a positive photoresist material according to an example embodiment.
Figure 9:
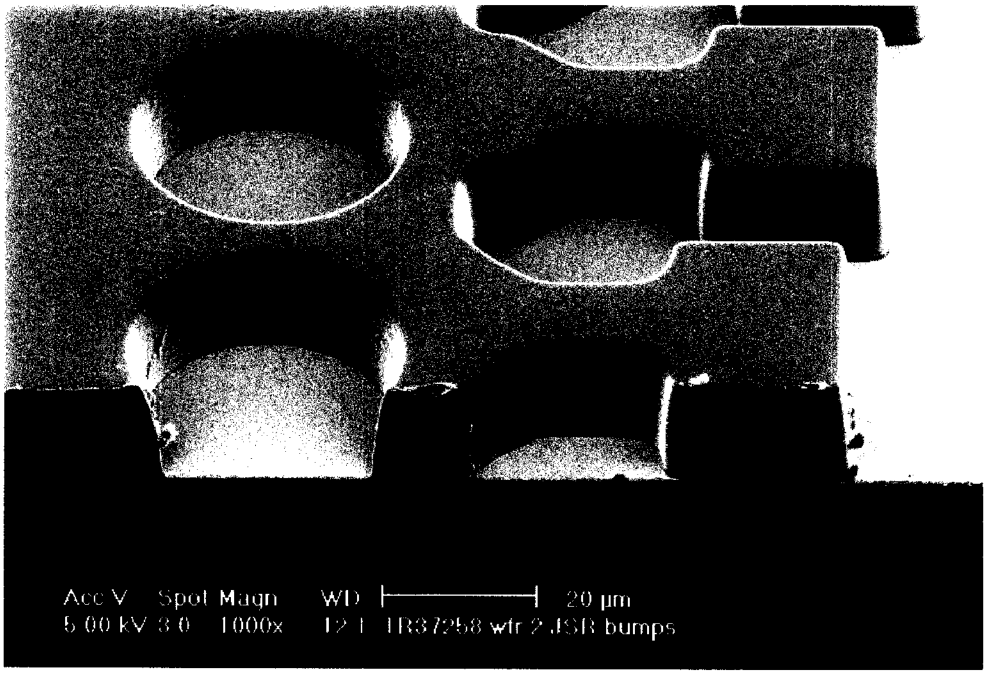
FIG. 9 is a scanning electron micrograph showing a sacrificial layer formed of a negative photoresist material according to an example embodiment.
Figure 10:
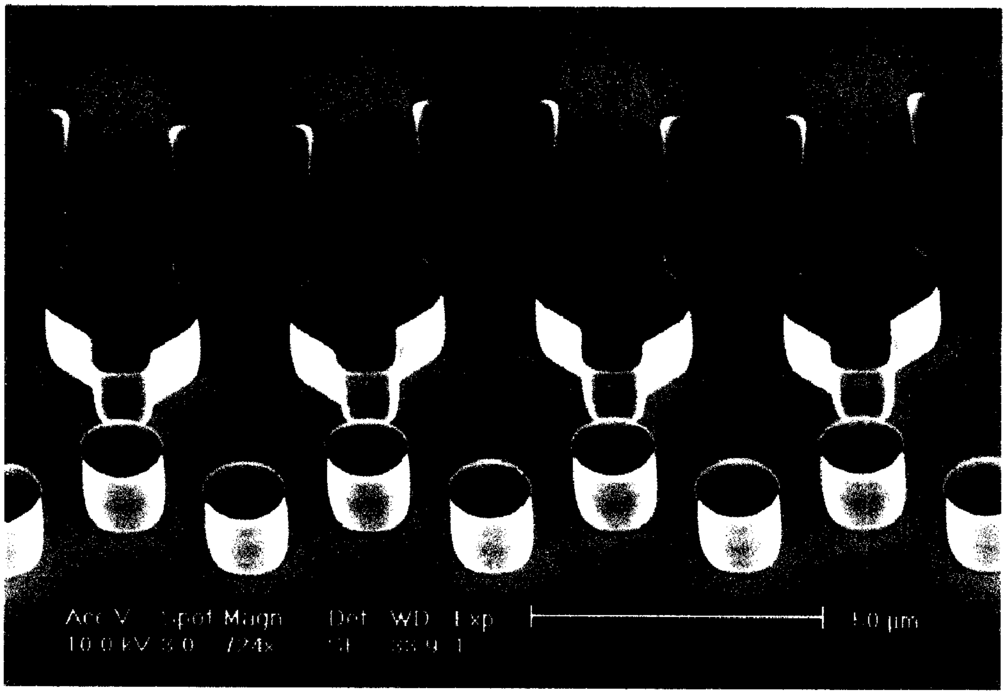
FIG. 10 is a scanning electron micrograph showing a number of ink jet printhead chambers subsequent to the removal of the positive photoresist material shown in FIG. 8.
Figure 11:
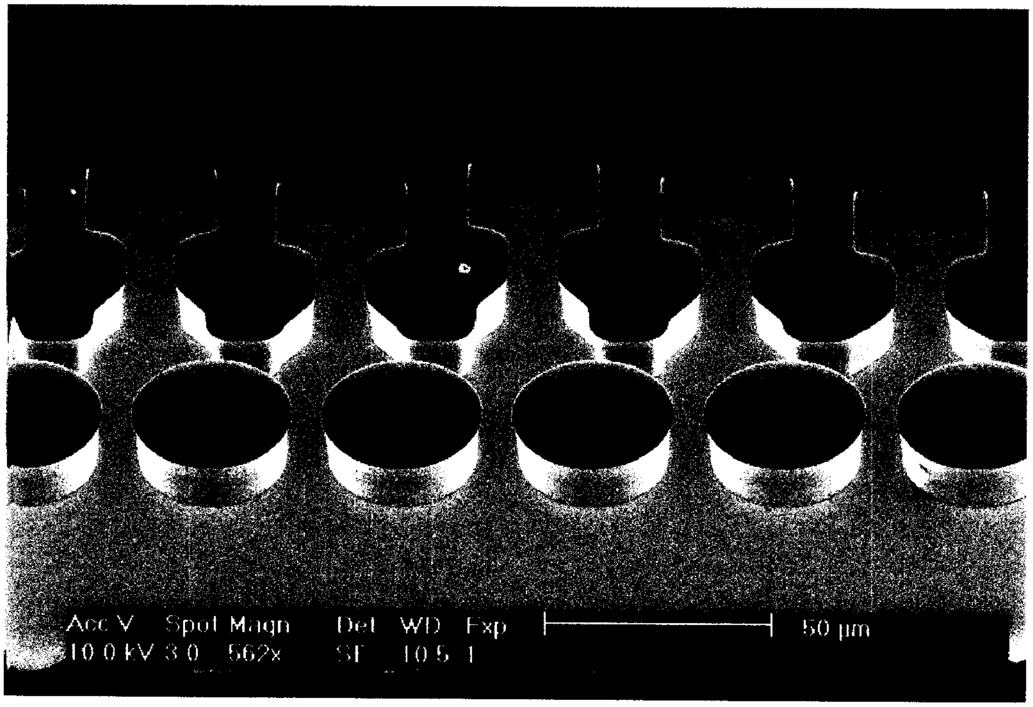
FIG. 11 is a scanning electron micrograph showing a number of ink jet printhead chambers subsequent to the removal of the negative photoresist material shown in FIG. 9.

FIGS. 8 through 11 are scanning electron micrographs illustrating the formation of ink jet printhead chambers according to example embodiments. FIG. 8 shows a chamber level sacrificial structure formed of a positive photoresist, magnified at 500 times. FIG. 9 shows a similar chamber level sacrificial structure formed from a negative photoresist material magnified at 1,000 times. FIGS. 10 and 11 show the formation of chambers subsequent to the removal of the sacrificial photoresist structures shown in FIGS. 8 and 9, respectively. FIG. 8 illustrates the initial shape of the resist mandrel created from the SPR220 resist. The shape of the walls of the plated material in FIG. 10 conforms to the initial shape of the plating resist shown in FIG. 8. FIGS. 9 and 11 show that nickel plated around the JSR THB 151N resist also conforms well to the resist shape. FIGS. 10 and 11 also illustrate that it is possible to deposit structures that have a relatively flat or planar surface.

Figure 12:
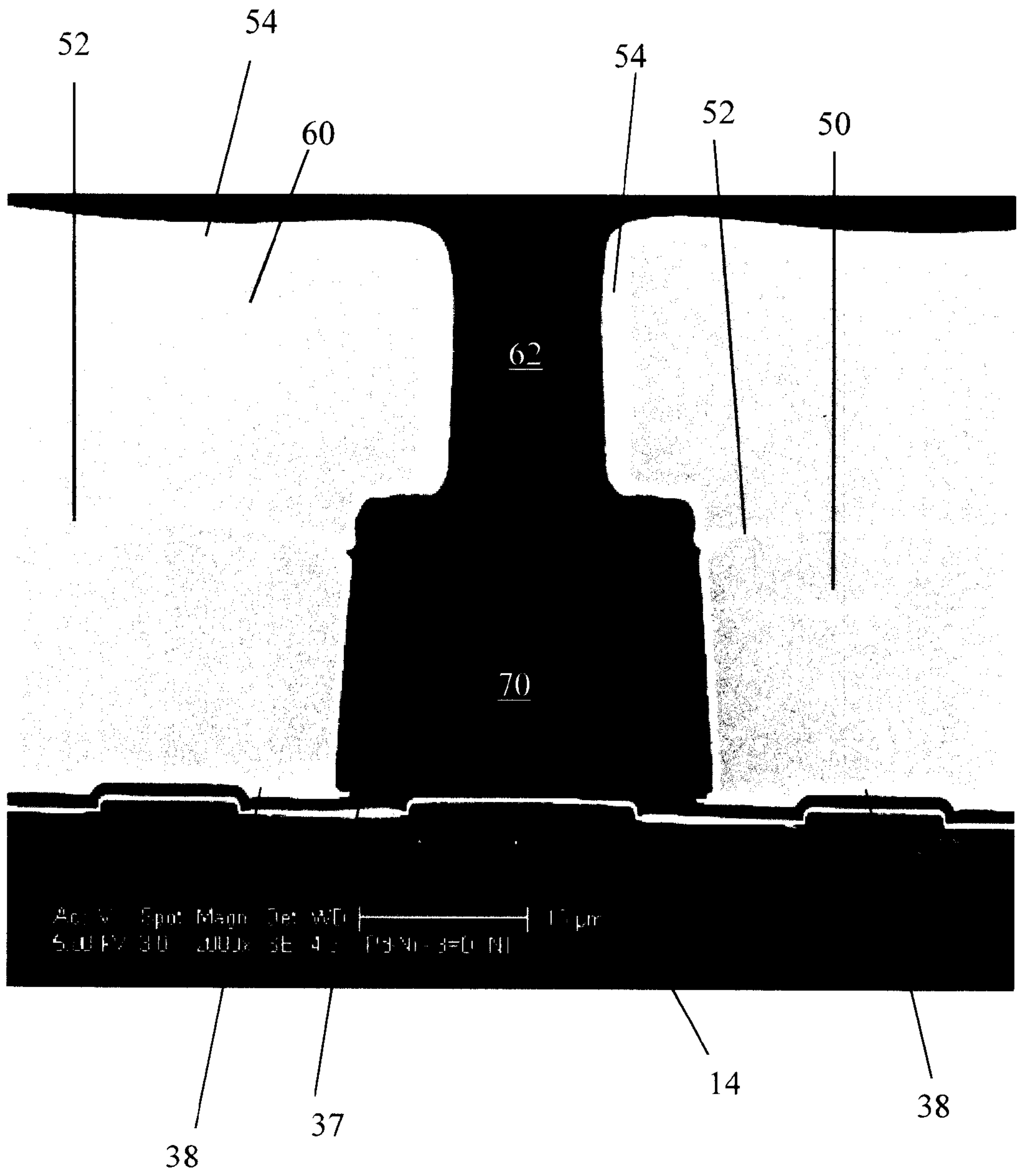
FIG. 12 is a scanning electron micrograph showing an embodiment of the microfluidic architecture having a layer with a predetermined surface property thereon.

FIG. 12 is a scanning electron micrograph illustrating the formation of a microfluidic architecture having the layer 54 thereon. As shown, the layer 54 conforms to the chamber layer 50 and the nozzle layer 60, and comes to rest on seed layer 38. As depicted, the layer 54 does not contact the substrate 12.

It is to be understood that any of the various embodiments disclosed herein may include the layer 54 having the predetermined surface characteristic. It is to be further understood that the layer 54 may be positioned on the chamber layer 50 (also depicted as 150, 250, 350), the nozzle layer 60 (also depicted as 160), and/or those areas/elements (generally excluding the substrate 12) that are adjacent the microfluidic chamber 70 (also depicted as 170, 370).

The embodiment(s) disclosed offer many advantages, including, but not limited to the following. The selective electroplating of the layer 54 having a predetermined property and the chamber layer 50 allow the cost of manufacturing to be relatively inexpensive while maintaining the desired surface integrity of the architecture 10. Further, a variety of materials may be selected for the various architecture elements (e.g. layer 54, chamber layer 50, nozzle 60), as they are established individually. Still further, embodiment(s) of the microfluidic architecture(s) 10 described herein are advantageously suitable for use in a variety of devices, such as for example, ink-jet printheads, fuel injectors, microfluidic biological devices, pharmaceutical dispensing devices, and/or the like.

While several embodiments have been described in detail, it will be apparent to those skilled in the art that the disclosed embodiments may be modified. Therefore, the foregoing description is to be considered exemplary rather than limiting.

What is claimed is:

1. A method of making a microfluidic architecture, the method comprising:

establishing a thin film stack on a substrate adjacent to an edge of the substrate, the thin film stack including a non-conducting layer and a seed layer;

selectively etching the thin film stack such that a portion of the substrate and a portion of the non-conducting layer are exposed;

establishing a sacrificial layer on the exposed substrate and on the exposed non-conducting layer;

electroplating a chamber layer on the seed layer;

removing the sacrificial layer, thereby forming a microfluidic chamber; and selectively electroplating a layer having a predetermined surface property at least on the chamber layer and the exposed portion of the non-conducting layer, the layer having the predetermined surface property selectively providing the predetermined surface property to the microfluidic architecture.

2. The method as defined in claim 1, further comprising:

additionally establishing the sacrificial layer on a portion of the seed layer;

additionally electroplating the chamber layer on an other portion of the seed layer, wherein the sacrificial layer removing includes removing the sacrificial layer from an other portion of the seed layer; and additionally establishing the layer having a predetermined surface property on the other portion of the seed layer.

3. The method as defined in claim 2 wherein establishing the sacrificial layer is accomplished by at least one of chemical vapor deposition, physical vapor deposition, spray coating, spin coating, and a lamination process.

4. The method as defined in claim 1 wherein establishing the thin film stack includes establishing the non-conducting layer and then establishing the seed layer on the non-conducting layer.

5. The method as defined in claim 1, further comprising establishing a resistor and a resistor protective layer on the substrate prior to establishing the thin film stack.

6. The method as defined in claim 5 wherein establishing is accomplished by at least one of deposition and patterning techniques.

7. The method as defined in claim 1 wherein establishing the nonconducting layer and the seed layer is accomplished by physical vapor deposition, evaporative deposition, chemical vapor deposition, plasma enhanced physical vapor deposition, plasma enhanced chemical vapor deposition, or spin-coating.

8. The method as defined in claim 1 wherein selectively etching is accomplished by plasma etching or wet chemical etching.

9. The method as defined in claim 1 wherein removing the sacrificial layer is accomplished by solvent stripping, oxygen plasma etching, acidic solutions, or basic solutions.

10. The method as defined in claim 1, further comprising:

establishing a second sacrificial layer in the microfluidic chamber in a predetermined pattern;

selectively electroplating a nozzle layer on a predetermined portion of the second sacrificial layer and on the layer having a predetermined surface property;

removing the second sacrificial layer thereby forming the nozzle layer having an aperture defined therein such that fluid may at least one of enter and exit the microfluidic chamber.

11. The method as defined in claim 10, further comprising selectively electroplating the layer having a predetermined surface property on the nozzle layer and on predetermined areas of the microfluidic chamber.

12. A microfluidic architecture, comprising:

a thin film stack established on at least a portion of the substrate adjacent an edge of the substrate, the thin film stack including a non-conducting layer, a seed layer, and a chamber layer, the thin film stack and the substrate defining a microfluidic chamber; and a layer having a predetermined surface property, formed at least on the chamber layer, the layer having the predetermined surface property having a portion that rests on an exposed portion of the non-conductive layer, the layer having the predetermined surface property selectively providing the predetermined surface property to the microfluidic architecture.

13. The microfluidic architecture as defined in claim 12, further comprising a nozzle layer established between the thin film stack and the means for selectively providing a predetermined surface property to the microfluidic architecture, the nozzle layer having an aperture defined therein.

14. The microfluidic architecture as defined in claim 13 wherein at least one of the chamber and the nozzle layer aperture is adapted to contain at least one of biological fluids, inks, pharmaceutical fluids, and fuels.

15. The microfluidic architecture as defined in claim 12 wherein the nonconducting layer comprises a dielectric material.

16. The microfluidic architecture as defined in claim 12 wherein the seed layer comprises at least one of tantalum and gold, gold, nickel, nickel-chromium alloys, copper, titanium and gold, titanium-tungsten alloys, titanium, palladium, chromium, rhodium, alloys thereof, and combinations thereof.

17. A method of making a microfluidic architecture, the method comprising:

establishing a thin film stack on a substrate adjacent to an edge of the substrate, the thin film stack including a non-conducting layer and a seed layer;

selectively etching the thin film stack such that a portion of the substrate and a portion of the non-conducting layer are exposed;

establishing a sacrificial layer on the exposed substrate and on the exposed non-conducting layer;

electroplating a chamber layer on the seed layer;

establishing a second seed layer on the chamber layer and on the sacrificial layer;

establishing a second sacrificial layer on a predetermined portion of the second seed layer;

electroplating a nozzle layer on an other portion of the second seed layer;

removing the second sacrificial layer, the predetermined portion of the second seed layer, and the sacrificial layer, thereby forming an aperture in the nozzle layer and a microfluidic chamber; and selectively electroplating a layer having a predetermined surface property at least on the nozzle layer and the exposed portion of the non-conducting layer, the layer having the predetermined surface property selectively providing the predetermined surface property to the microfluidic architecture.

18. The method as defined in claim 17, further comprising:

additionally establishing the sacrificial layer on a portion of the seed layer;

additionally electroplating the chamber layer on an other portion of the seed layer, wherein the sacrificial layer removing includes removing the sacrificial layer from an other portion of the seed layer; and additionally establishing the layer having a predetermined surface property on the other portion of the seed layer.

19. The method as defined in claim 17 wherein establishing the thin film stack includes establishing the non-conducting layer and then establishing the seed layer on the non-conducting layer.

20. The method as defined in claim 17, further comprising establishing a resistor and a resistor protective layer on the substrate prior to establishing the thin film stack.

21. The method as defined in claim 17 wherein selectively etching is accomplished by at least one of plasma etching and wet chemical etching.

22. The method as defined in claim 17 wherein removing the sacrificial layer and the second sacrificial layer is accomplished by solvent stripping, oxygen plasma etching, acidic solutions, or basic solutions.

* * * * *